(12) United States Patent
Hasegawa et al.

(10) Patent No.: US 8,029,916 B2
(45) Date of Patent: Oct. 4, 2011

(54) BRAZING FILLER METAL, BRAZING COMPOSITE MATERIAL AND BRAZED STRUCTURE BRAZED/BONDED WITH THE SAME

(75) Inventors: Tsuyoshi Hasegawa, Minamikawachi-gun (JP); Masaaki Ishio, Osaka (JP); Yoshimitsu Oda, Suita (JP)

(73) Assignee: Neomax Materials Co., Ltd., Suita-shi (JP)

( * ) Notice: Subject to any disclaimer, the term of this patent is extended or adjusted under 35 U.S.C. 154(b) by 925 days.

(21) Appl. No.: 11/578,511

(22) PCT Filed: Mar. 24, 2006

(86) PCT No.: PCT/JP2006/005914
§ 371 (c)(1),
(2), (4) Date: Oct. 16, 2006

(87) PCT Pub. No.: WO2006/104025
PCT Pub. Date: Oct. 5, 2006

(65) Prior Publication Data
US 2007/0224445 A1    Sep. 27, 2007

(30) Foreign Application Priority Data
Mar. 29, 2005  (JP) .................... 2005-094323

(51) Int. Cl.
*B23K 35/14* (2006.01)
(52) U.S. Cl. ......... 428/660; 428/679; 428/680; 428/685
(58) Field of Classification Search .................. None
See application file for complete search history.

(56) References Cited

U.S. PATENT DOCUMENTS

| | | | | | |
|---|---|---|---|---|---|
| 3,015,885 | A | * | 1/1962 | McEuen et al. | 228/118 |
| 3,973,952 | A | * | 8/1976 | Bieber et al. | 420/443 |
| 4,023,936 | A | * | 5/1977 | Morse et al. | 428/679 |
| 5,236,788 | A | * | 8/1993 | Manier et al. | 428/626 |
| 5,537,814 | A | * | 7/1996 | Nastuk et al. | 60/796 |
| 5,553,770 | A | | 9/1996 | Jha et al. | |

FOREIGN PATENT DOCUMENTS

| | | |
|---|---|---|
| JP | 60-54269 A | 3/1985 |
| JP | 7-299592 A | 11/1995 |
| JP | 7-2999592 A | 11/1995 |
| JP | 2003-117678 A | 4/2003 |
| JP | 2004-291076 A | 10/2004 |
| WO | WO 00/18537 A1 | 4/2000 |

OTHER PUBLICATIONS

Gray et al., Metal Progress—Databook 1978, p. 106, INCONEL 617 Technical Data.* International Search Report of PCT/JP2006/305914, date of mailing May 2, 2006.
Supplementary European Search Report dated Mar. 24, 2010, issued in corresponding European Patent Application No. 6729862.0.

* cited by examiner

Primary Examiner — Timothy Speer
Assistant Examiner — Adam Krupicka
(74) Attorney, Agent, or Firm — Westerman, Hattori, Daniels & Adrian, LLP

(57) ABSTRACT

A brazing filler metal capable of improving both of oxidation resistance and corrosion resistance is obtained. This brazing filler metal (1, 1*d*, 51 and 51*a*) consists of at least a three-layer structure of an Ni—Cr brazing layer (2 and 2*a*) consisting of an Ni—Cr alloy layer, a Ti brazing layer (3, 3*a*, 3*b*, 3*c* and 3*d*) consisting of a Ti layer or a Ti alloy layer and an Ni brazing layer (4, 4*a*, 4*b*, 4*c* and 4*d*) consisting of an Ni layer or an N alloy layer arranged between the Ni—Cr brazing layer and the Ti brazing layer.

17 Claims, 10 Drawing Sheets

BRAZING FILLER METAL, BRAZING COMPOSITE MATERIAL AND BRAZED STRUCTURE BRAZED/BONDED WITH THE SAME

TECHNICAL FIELD

The present invention relates to a brazing filler metal, a brazing composite material and a brazed structure brazed/bonded with the same, and more particularly, it relates to a brazing filler metal constituting a channel of a heat exchanger such as a radiator or a gas cooler, a brazing composite material and a brazed structure brazed/bonded with the same.

BACKGROUND ART

The interest in environmental problems has been internationally elevated in recent years, and a cogeneration system employing a fuel cell or a micro gas turbine has been developed and widespread as a link thereof. High-temperature gas flows in a heat exchanger constituting this cogeneration system, and the temperature of this gas tends to increase in order to improve heat generation efficiency. In general, a material prepared by employing stainless steel for a substrate while employing nickel solder (JIS BNi-1 to 7) for a brazing filler metal is known as a heat exchanger material capable of withstanding a severe service condition under such a high temperature. Nickel solder, which is a material excellent in oxidation resistance and corrosion resistance but hard to plasticize, is generally manufactured in a powder state by a liquid quenching method. Thus, nickel solder has been inconveniently high-priced. Further, a debindering step is necessary after brazing since a pasty material prepared by mixing a binder into powdery nickel solder is applied to stainless steel forming the substrate in a manufacturing step for the heat exchanger, and there has been such inconvenience that the manufacturing step is complicated.

In the meantime, there is generally proposed a technique of manufacturing a brazing filler metal consisting of a laminated structure of an Ni-based metal layer and an Ni-based metal layer consisting of an Mn—Ni—Cu alloy by employing rolling/bonding without employing the aforementioned liquid quenching method and brazing/bonding stainless steel with this brazing filler metal. Such a technique is disclosed in International Patent Laying-Open No. WO00/18537, for example. According to this International Patent Laying-Open No. WO00/18537, the Mn—Ni—Cu alloy is made to contain Cr, Ti etc. to be not more than 5 mass % in total, thereby improving oxidation resistance.

In general, further, there is known a technique of employing a Ti—Ni-based brazing filler metal consisting of two layers, i.e., a Ti or Ti-based alloy layer and an Ni or Ni-based alloy layer having high corrosion resistance as a brazing composite material prepared by rolling/bonding without employing the aforementioned liquid quenching method. Such a technique is disclosed in Japanese Patent Laying-Open No. 2003-117678, for example. In this Japanese Patent Laying-Open No. 2003-117678, an Ni—Cr—Fe-based anticorrosion/heat-resistant superalloy is listed as an Ni alloy.

However, the Mn—Ni—Cu alloy constituting part of the conventional brazing filler metal disclosed in the aforementioned International Patent Laying-Open No. WO00/18537 has such a problem that it is difficult to improve corrosion resistance of a portion bonded by brazing/bonding since Mn and Cu having low corrosion resistance are contained in the alloy.

Further, the conventional Ti—Ni-based brazing filler metal disclosed in the aforementioned Japanese Patent Laying-Open No. 2003-117678 has such a problem that it is difficult to obtain high oxidation resistance since no oxide film (passive film) of $Cr_2O_3$ is formed on the surface of a portion bonded by brazing/bonding, although the same has high corrosion resistance. Also when the Ni—Cr—Fe-based anticorrosion/heat-resistant superalloy listed in Japanese Patent Laying-Open No. 2003-117678 as the Ni alloy is employed, the rate of reaction between the brazing filler metal and the Ni—Cr—Fe-based anticorrosion/heat-resistant superalloy in brazing is retarded since the melting temperature of the Ni—Cr—Fe-based anticorrosion/heat-resistant superalloy is high (about 1800° C. to about 2000° C.). Thus, the rate of diffusion of Cr from the Ni—Cr—Fe-based anticorrosion/heat-resistant superalloy into the brazed/bonded portion is retarded, and hence there is such inconvenience that Cr is not sufficiently supplied to the brazed/bonded portion. Thus, there is such a problem that it is difficult to obtain high oxidation resistance since no oxide film (passive film) of $Cr_2O_3$ of a sufficient quantity is formed on the surface of the portion bonded by brazing/bonding.

DISCLOSURE OF THE INVENTION

The present invention has been proposed in order to solve the aforementioned problems, and aims at providing a brazing filler metal capable of improving both of oxidation resistance and corrosion resistance, a brazing composite material and a brazed structure brazed/bonded with the same.

In order to attain the aforementioned object, a brazing filler metal according to a first aspect of the present invention consists of at least a three-layer structure of an Ni—Cr brazing layer consisting of an Ni—Cr alloy layer, a Ti brazing layer consisting of a Ti layer or a Ti alloy layer and an Ni brazing layer consisting of an Ni layer or an Ni alloy layer arranged between the Ni—Cr brazing layer and the Ti brazing layer.

In this brazing filler metal according to the first aspect, as hereinabove described, the brazing filler metal is so constituted of the Ni—Cr brazing layer, the Ti brazing layer and the Ni brazing layer that a Ti—Ni—Cr-based alloy is formed on a portion bonded by brazing/bonding, whereby an oxide film (passive film) of $Cr_2O_3$ can be easily formed on the surface of the bonded portion. Thus, oxidation resistance of the portion bonded by brazing/bonding can be improved. Further, the brazing filler metal is so constituted of the Ni—Cr brazing layer, the Ti brazing layer and the Ni brazing layer that corrosion resistance of the portion boned by brazing/bonding can be improved since Ti, Ni and Cr having high corrosion resistance are contained in the portion bonded by brazing/bonding. In addition, the Ni brazing layer is so arranged between the Ni—Cr brazing layer and the Ti brazing layer that a time when Ti contained in the Ti brazing layer and Cr contained in the Ni—Cr alloy layer mix with each other can be reduced in a process of performing brazing/bonding. Thus, it is possible to suppress formation of fragile $TiCr_2$ through reaction between Ti contained in the Ti brazing layer and Cr contained in the Ni—Cr alloy layer, whereby the portion bonded by brazing/bonding can be inhibited from becoming fragile. Further, the brazing filler metal is so constituted of the Ni—Cr brazing layer, the Ti brazing layer and the Ni brazing layer that the brazing filler metal is layered, to require no binder mixed in a case of employing a powdery brazing filler metal. Thus, there is no need to perform debindering after brazing/ bonding when performing brazing/bonding with a layered brazing filler metal, whereby manufacturing steps can be simplified.

In the aforementioned brazing filler metal according to the first aspect, the content of Cr in the Ni—Cr brazing layer consisting of an Ni—Cr alloy layer is preferably at least 20 mass % and not more than 40 mass %. According to this structure, an oxide film (passive film) of $Cr_2O_3$ having a sufficient thickness can be formed on the surface of the portion bonded by brazing/bonding by setting the content of Cr in the Ni—Cr alloy layer to at least 20 mass %, whereby high oxidation resistance can be attained. Further, ductility of the Ni—Cr alloy can be inhibited from lowering by setting the content of Cr in the Ni—Cr alloy layer to not more than 40 mass %, whereby bonding with a substrate by cold welding or the like can be easily performed.

In the aforementioned brazing filler metal according to the first aspect, the Ni content in the Ni brazing layer is preferably at least 21.5 mass % and not more than 37.5 mass % assuming that the sum of the Ti content in the Ti brazing layer and the Ni content in the Ni brazing layer is 100 mass %. According to this structure, Ti in the Ti brazing layer and Ni in the Ni brazing layer can be melted at a temperature of not more than about 1220° C. by setting the Ni content in the Ni brazing layer to at least 21.5 mass %. Thus, Ti in the Ti brazing layer and Ni in the Ni brazing layer can be melted without employing a specific furnace outputting a high temperature of at least about 1220° C. Further, the Ni content in the Ni brazing layer is so set to not more than 37.5 mass % that the portion bonded by brazing/bonding can be inhibited from formation of an intermetallic compound consisting of $Ti_2Ni$, dissimilarly to a case of increasing the Ni content beyond 37.5 mass %. Consequently, formation of fragile $Ti_2Ni$ on the brazed/bonded portion can be suppressed, whereby the portion bonded by brazing/bonding can be inhibited from becoming fragile.

In this case, the Ni content in the Ni brazing layer is preferably a content around 28.3 mass % assuming that the sum of the Ti content in the Ti brazing layer and the Ni content in the Ni brazing layer is 100 mass %. According to this structure, a Ti—Ni alloy of a eutectic composition can be obtained in an initial stage of brazing, whereby the Ti—Ni alloy which is in a solid phase state can be converted to a liquid phase state at about 955° C. which is the eutectic temperature of the Ti—Ni alloy. Thus, it is possible to melt the Ti—Ni alloy at a low temperature (about 955° C.) for making the same function as a brazing filler metal.

In the aforementioned brazing filler metal according to the first aspect, the ratio t2/t1 between the thickness t1 of the Ti brazing layer and the thickness t2 of the Ni brazing layer may be set to at least ⅛ and not more than 2/7. According to this structure, the Ni content in the Ni brazing layer with respect to the Ti content in the Ti brazing layer can be set to at least 21.5 mass % and not more than 37.5 mass % assuming that the sum of the Ti content in the Ti brazing layer and the Ni content in the Ni brazing layer is 100 mass %. Consequently, it is possible to melt Ti in the Ti brazing layer and Ni in the Ni brazing layer at a temperature of not more than about 1220° C. requiring no specific furnace and it is possible to attain a composition (mass %) ratio between Ti and Ni capable of inhibiting the portion bonded by brazing/bonding from formation of an intermetallic compound of fragile $Ti_2Ni$ by simply setting the ratio between the thicknesses of the Ti brazing layer and the Ni brazing layer to at least ⅛ and not more than 2/7.

In this case, the ratio t2/t1 between the thickness t1 of the Ti brazing layer and the thickness t2 of the Ni brazing layer may be substantially set to ⅕. According to this structure, the Ni content in the Ni brazing layer can be set to the content around 28.3 mass % which is a eutectic composition in an initial stage of brazing assuming that the sum of the Ti content in the Ti brazing layer and the Ni content in the Ni brazing layer is 100 mass %. Consequently, a Ti—Ni alloy of a eutectic composition can be easily obtained in the initial stage of brazing by simply setting the ratio between the thicknesses of the Ti brazing layer and the Ni brazing layer to ⅕.

In the aforementioned brazing filler metal according to the first aspect, the Ti brazing layer may include a first Ti brazing layer consisting of a first Ti layer or a first Ti alloy layer and a second Ti brazing layer consisting of a second Ti layer or a second Ti alloy layer, the Ni brazing layer may include a first Ni brazing layer consisting of a first Ni layer or a first Ni alloy layer and a second Ni brazing layer consisting of a second Ni layer or a second Ni alloy layer, and the brazing filler metal may consist of such a five-layer structure that the first Ni brazing layer is arranged between the Ni—Cr brazing layer and the first Ti brazing layer while the second Ni brazing layer is arranged between the Ni—Cr brazing layer and the second Ti brazing layer. According to this structure, a portion coming into contact with a brazed member can be the first Ti layer (second Ti layer) or the first Ti alloy layer (second Ti alloy layer) when performing brazing/bonding with the brazing filler metal consisting of the five-layer structure. Thus, the Ni—Cr alloy layer melts from the outer layer in the process of brazing/bonding, whereby brazing/bonding can be easily performed.

In the aforementioned brazing filler metal according to the first aspect, at least any one of the Ni—Cr brazing layer, the Ti brazing layer and the Ni brazing layer preferably contains at least either Mo or Co. According to this structure, Cr and Mo or Co form an alloy on the portion bonded by brazing/bonding in brazing to increase the Cr concentration on the surface of the bonded portion while an oxide film of $Cr_2O_3$ can be more sufficiently formed on the surface of the bonded portion, whereby oxidation resistance of the portion bonded by brazing/bonding can be further improved.

In the aforementioned brazing filler metal containing at least either Mo or Co, the content of the whole Mo contained in at least any one of the Ni—Cr brazing layer, the Ti brazing layer and the Ni brazing layer is preferably at least 2.0 mass % and not more than 4.5 mass %. According to this structure, oxidation resistance of the bonded portion can be sufficiently and effectively improved.

In the aforementioned brazing filler metal containing at least either Mo or Co, the content of the whole Co contained in at least any one of the Ni—Cr brazing layer, the Ti brazing layer and the Ni brazing layer is preferably at least 2.0 mass % and not more than 10.0 mass %. According to this structure, oxidation resistance of the bonded portion can be sufficiently and effectively improved.

A brazing composite material according to a second aspect of the present invention comprises a substrate made of steel and a brazing filler metal, rolled/bonded to the surface of the substrate, consisting of at least a three-layer structure of an Ni—Cr brazing layer consisting of an Ni—Cr alloy layer, a Ti brazing layer consisting of a Ti layer or a Ti alloy layer and an Ni brazing layer consisting of an Ni layer or an Ni alloy layer arranged between the Ni—Cr brazing layer and the Ti brazing layer.

As hereinabove described, this brazing composite material according to the second aspect so comprises the brazing filler metal constituted of the Ni—Cr brazing layer, the Ti brazing layer and the Ni brazing layer that a Ti—Ni—Cr-based alloy is formed on a portion bonded by brazing/bonding, whereby an oxide film (passive film) of $Cr_2O_3$ can be easily formed on the surface of the bonded portion. Thus, oxidation resistance of the portion bonded by bonding/brazing can be improved. Further, the brazing composite material so comprises the brazing filler metal constituted of the Ni—Cr brazing layer, the Ti brazing layer and the Ni brazing layer that corrosion resistance of the portion bonded by brazing/bonding can be improved since Ti, Ni and Cr having high corrosion resistance are contained in the portion bonded by brazing/bonding. In addition, the Ni brazing layer is so arranged between the Ni—Cr brazing layer and the Ti brazing layer that a time when Ti contained in the Ti brazing layer and Cr contained in the Ni—Cr alloy layer mix with each other can be reduced in a process of performing brazing/bonding. Thus, it is possible to suppress formation of fragile $TiCr_2$ through reaction between Ti contained in the Ti brazing layer and Cr contained in the Ni—Cr alloy layer, whereby the portion bonded by brazing/bonding can be inhibited from becoming fragile. Further, the brazing composite material is so formed by rolling/bonding the layered brazing filler metal consisting of at least the three-layer structure of the Ni—Cr brazing layer, the Ti brazing layer and the Ni brazing layer that manufacturing steps for the brazing filler metal can be inhibited from complication dissimilarly to a case of employing a powdery brazing filler metal formed by a liquid quenching method. Thus, the manufacturing steps for the brazing composite material can be inhibited from complication. In addition, the brazing filler metal is layered, to require no binder mixed in a case of employing a powdery brazing filler metal. Thus, there is no need to perform debindering after brazing/bonding when performing brazing/bonding with a layered brazing filler metal, whereby manufacturing steps can be simplified.

In the aforementioned brazing composite material according to the second aspect, the content of Cr in the Ni—Cr brazing layer consisting of an Ni—Cr alloy layer is preferably at least 20 mass % and not more than 40 mass %. According to this structure, an oxide film (passive film) of $Cr_2O_3$ having a sufficient thickness can be formed on the surface of the portion bonded by brazing/bonding by setting the content of Cr in the Ni—Cr alloy layer to at least 20 mass %, whereby high oxidation resistance can be attained. Further, ductility of the Ni—Cr alloy can be inhibited from lowering by setting the content of Cr in the Ni—Cr alloy layer to not more than 40 mass %, whereby bonding with a substrate by cold welding or the like can be easily performed.

In the aforementioned brazing composite material according to the second aspect, the Ni content in the Ni brazing layer is preferably at least 21.5 mass % and not more than 37.5 mass % assuming that the sum of the Ti content in the Ti brazing layer and the Ni content in the Ni brazing layer is 100 mass %. According to this structure, Ti in the Ti brazing layer and Ni in the Ni brazing layer can be melted at a temperature of not more than about 1220° C. by setting the Ni content in the Ni brazing layer to at least 21.5 mass %. Thus, Ti in the Ti brazing layer and Ni in the Ni brazing layer can be melted without employing a specific furnace outputting a high temperature of at least about 1220° C. Further, the Ni content in the Ni brazing layer is so set to not more than 37.5 mass % that the portion bonded by brazing/bonding can be inhibited from formation of an intermetallic compound consisting of $Ti_2Ni$, dissimilarly to a case of increasing the Ni content beyond 37.5 mass %. Consequently, formation of fragile $Ti_2Ni$ on the brazed/bonded portion can be suppressed.

In this case, the Ni content in the Ni brazing layer is preferably a content around 28.3 mass % assuming that the sum of the Ti content in the Ti brazing layer and the Ni content in the Ni brazing layer is 100 mass %. According to this structure, a Ti—Ni alloy of a eutectic composition can be obtained in an initial stage of brazing, whereby the Ti—Ni alloy which is in a solid phase state can be converted to a liquid phase state at about 955° C. which is the eutectic temperature of the Ti—Ni alloy. Thus, it is possible to melt the Ti—Ni alloy at a low temperature (about 955° C.) for making the same function as a brazing filler metal.

In the aforementioned brazing composite material according to the second aspect, the ratio t2/t1 between the thickness t1 of the Ti brazing layer and the thickness t2 of the Ni brazing layer is at least ⅛ and not more than ⅔. According to this structure, the Ni content in the Ni brazing layer with respect to the Ti content in the Ti brazing layer can be set to at least 21.5 mass % and not more than 37.5 mass % assuming that the sum of the Ti content in the Ti brazing layer and the Ni content in the Ni brazing layer is 100 mass %. Thus, Consequently, it is possible to melt Ti in the Ti brazing layer and Ni in the Ni brazing layer at a temperature of not more than about 1220° C. requiring no specific furnace and it is possible to attain a composition (mass %) ratio between Ti and Ni capable of inhibiting the portion bonded by brazing/bonding from formation of an intermetallic compound of fragile $Ti_2Ni$ by simply setting the ratio between the thicknesses of the Ti brazing layer and the Ni brazing layer to at least ⅛ and not more than ⅔.

In this case, the ratio t2/t1 between the thickness t1 of the Ti brazing layer and the thickness t2 of the Ni brazing layer may be substantially set to ⅕. According to this structure, the Ni content in the Ni brazing layer can be set to the content around 28.3 mass % which is a eutectic composition in an initial stage of brazing assuming that the sum of the Ti content in the Ti brazing layer and the Ni content in the Ni brazing layer is 100 mass %. Consequently, a Ti—Ni alloy of a eutectic composition can be easily obtained in the initial stage of brazing by simply setting the ratio between the thicknesses of the Ti brazing layer and the Ni brazing layer to ⅕.

In the aforementioned brazing composite material according to the second aspect, at least any one of the Ni—Cr brazing layer, the Ti brazing layer and the Ni brazing layer preferably contains at least either Mo or Co. According to this structure, Cr and Mo or Co form an alloy on the portion bonded by brazing/bonding in brazing to increase the Cr concentration on the surface of the bonded portion while an oxide film of $Cr_2O_3$ can be more sufficiently formed on the surface of the bonded portion, whereby oxidation resistance of the portion bonded by brazing/bonding can be further improved.

In the aforementioned brazing composite material containing at least either Mo or Co, the brazing filler metal preferably contains at least 2.0 mass % and not more than 4.5 mass % of Mo. According to this structure, oxidation resistance of the bonded portion can be sufficiently and effectively improved.

In the aforementioned brazing composite material containing at least either Mo or Co, the brazing filler metal preferably contains at least 2.0 mass % and not more than 10.0 mass % of Co. According to this structure, oxidation resistance of the bonded portion can be sufficiently and effectively improved.

A brazed structure according to a third aspect of the present invention is preferably formed by being brazed/bonded with a brazing composite material comprising a substrate made of steel and a brazing filler metal, rolled/bonded to the surface of the substrate, consisting of at least a three-layer structure of an Ni—Cr brazing layer consisting of an Ni—Cr alloy layer, a Ti brazing layer consisting of a Ti layer or a Ti alloy layer and an Ni brazing layer consisting of an Ni layer or an Ni alloy layer arranged between the Ni—Cr brazing layer and the Ti brazing layer.

This brazed structure according to the third aspect preferably contains a Ti—Ni—Cr alloy at least in a brazed/bonded portion. According to this structure, an oxide film (passive film) of $Cr_2O_3$ can be easily formed on the surface of a brazed/bonded portion, whereby oxidation resistance of the brazed/bonded portion can be improved. Further, the brazed/bonded portion so contains the Ti—Ni—Cr alloy that corrosion resistance of the brazed/bonded portion can be improved since Ti, Ni and Cr having high corrosion resistance are contained in the brazed/bonded portion.

In the aforementioned brazed structure containing the Ti—Ni—Cr alloy, the Ni content in the Ti—Ni—Cr alloy is preferably at least 59.5 mass % and not more than 70.0 mass % assuming that the sum of the Ti content and the Ni content in the Ti—Ni—Cr alloy is 100 mass %. According to this structure, the Ti—Ni—Cr alloy can be melted at a temperature of not more than about 1220° C. when forming the brazed structure according to the third aspect. Thus, the brazed structure according to the third aspect can be formed without employing a specific furnace outputting a high temperature of at least about 1220° C.

In this case, the Ni content in the Ti—Ni—Cr alloy is preferably a content around 64.4 mass % assuming that the sum of the Ti content and the Ni content in the Ti—Ni—Cr alloy is 100 mass %. According to this structure, a Ti—Ni alloy of a eutectic composition can be obtained in the Ti—Ni—Cr alloy after brazing, whereby Ti and Ni in the Ti—Ni—Cr alloy which is in a liquid phase state can be converted to a solid phase state at 1110° C. which is the eutectic temperature of the Ti—Ni alloy without through a solid-liquid coexistence state. Therefore, it is possible to easily solidify the Ti—Ni—Cr alloy by reducing the temperature thereof below the eutectic temperature 1100° C. Further, no solid-liquid coexistence state is present in the process of brazing/bonding, whereby fluidity (wettability) of the Ti—Ni—Cr alloy can be inhibited from lowering dissimilarly to a case where the Ti—Ni—Cr alloy is in a solid-liquid coexistence state. Consequently, the brazing filer metal consisting of the Ti—Ni—Cr alloy can be easily flown to the bonded portion.

In this brazed structure according to the third aspect, the content of Cr in the Ti—Ni—Cr alloy is preferably at least 11 mass %. According to this structure, a sufficient quantity of Cr is contained in the Ti—Ni—Cr alloy, whereby an oxide film (passive film) of $Cr_2O_3$ having a sufficient thickness can be formed on the surface of the brazed/bonded portion. Thus, oxidation resistance of the brazed/bonded portion can be further improved.

In the aforementioned brazed structure according to the third aspect, a brazed/bonded portion preferably contains at least either Mo or Co. According to this structure, the Cr concentration on the surface of the bonded portion can be increased while the oxide film of $Cr_2O_3$ can be more sufficiently formed on the surface of the bonded portion, whereby oxidation resistance of the portion bonded by brazing/bonding can be more improved.

In the aforementioned brazed structure having the brazed/bonded portion containing at least either Mo or Co, the brazed/bonded portion preferably contains at least 2.0 mass % and not more than 4.5 mass % of Mo. According to this structure, oxidation resistance of the bonded portion can be sufficiently and effectively improved.

In the aforementioned brazed structure having the brazed/bonded portion containing at least either Mo or Co, the brazed/bonded portion preferably contains at least 2.0 mass % and not more than 10.0 mass % of Co. According to this structure, oxidation resistance of the bonded portion can be sufficiently and effectively improved.

BEST MODES FOR CARRYING OUT THE INVENTION

Figure 1:
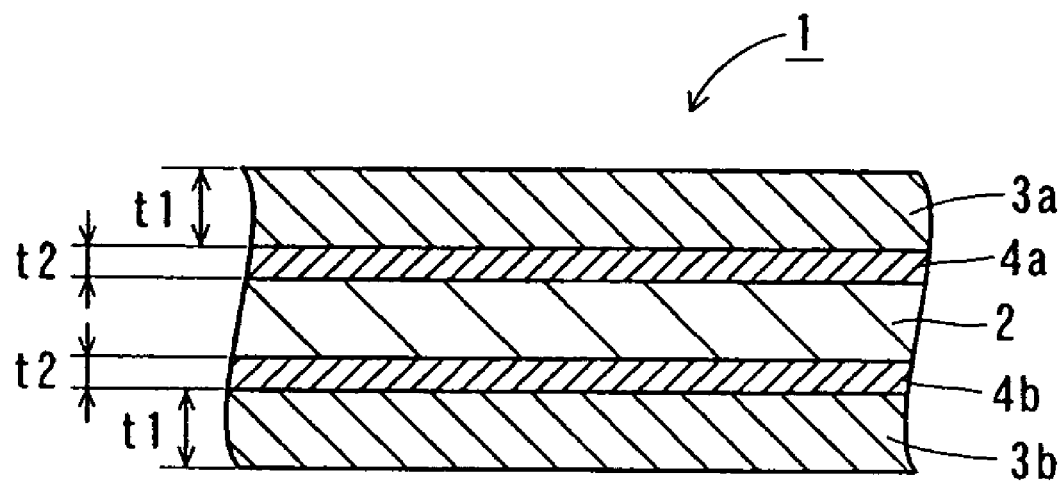
FIG. 1 A sectional view showing the structure of a brazing filler metal according to a first embodiment of the present invention.

Embodiments of the present invention are now described with reference to the drawings.

First Embodiment

First, the structure of a brazing filler metal 1 according to a first embodiment of the present invention is described with reference to FIG. 1.

The brazing filler metal 1 according to the first embodiment has an Ni—Cr alloy layer 2, a Ti layer 3a arranged on the side of a first surface of the Ni—Cr alloy layer 2, a Ti layer 3b arranged on the side of a second surface of the Ni—Cr alloy layer 2, an Ni layer 4a arranged between the Ni—Cr alloy layer 2 and the Ti layer 3a and an Ni layer 4b arranged between the Ni—Cr alloy layer 2 and the Ti layer 3b. The Ni layers 4a and 4b are rolled/bonded to the Ni—Cr alloy layer 2. The Ti layers 3a and 3b are rolled/bonded to the Ni layers 4a and 4b rolled/bonded to the Ni—Cr alloy layer 2. Hot welding, cold welding or vacuum welding can be employed as rolling/bonding, for example. The Ni—Cr alloy layer 2 is an example of the "Ni—Cr brazing layer" in the present invention. The Ti layer 3a is an example of the "Ti brazing layer" and the "first Ti brazing layer" in the present invention, and the Ti layer 3b is an example of the "Ti brazing layer" and the "second Ti brazing layer" in the present invention. The Ni layer 4a is an example of the "Ni brazing layer" and the "first Ni brazing layer" in the present invention, and the Ni layer 4b is an example of the "Ni brazing layer" and the "second Ni brazing layer" in the present invention.

The Ni—Cr alloy layer 2 is constituted of only Ni and Cr. The Cr content in this Ni—Cr alloy layer 2 is at least about 20 mass % and not more than about 40 mass %. The Ti layers 3a and 3b are constituted of only pure Ti. Further, the Ti layers 3a and 3b have a thickness t1 respectively. The Ni layers 4a and 4b are constituted of only pure Ni. Further, the Ni layers 4a and 4b have a thickness t2 respectively.

According to the first embodiment, the Ni content in the Ni layer 4a is at least 21.5 mass % and not more than 37.5 mass %, and is preferably about 28.3 mass % forming a eutectic composition of a Ti—Ni alloy in an initial stage in brazing, assuming that the sum of the Ti content in the Ti layer 3a and the Ni content in the Ni layer 4a is 100 mass %. Further, the Ni content in the Ni layer 4b is at least 21.5 mass % and not more than 37.5 mass %, and is preferably about 28.3 mass % forming the eutectic composition of the Ti—Ni alloy in the initial stage in brazing, assuming that the sum of the Ti content in the Ti layer 3b and the Ni content in the Ni layer 4b is 100 mass %. In addition, the ratio t2/t1 between the thickness t1 of the Ti layers 3a and 3b and the thickness t2 of the Ni layers 4a and 4b is at least ⅛ and not more than ⅖, and preferably about ⅕.

Figure 2:
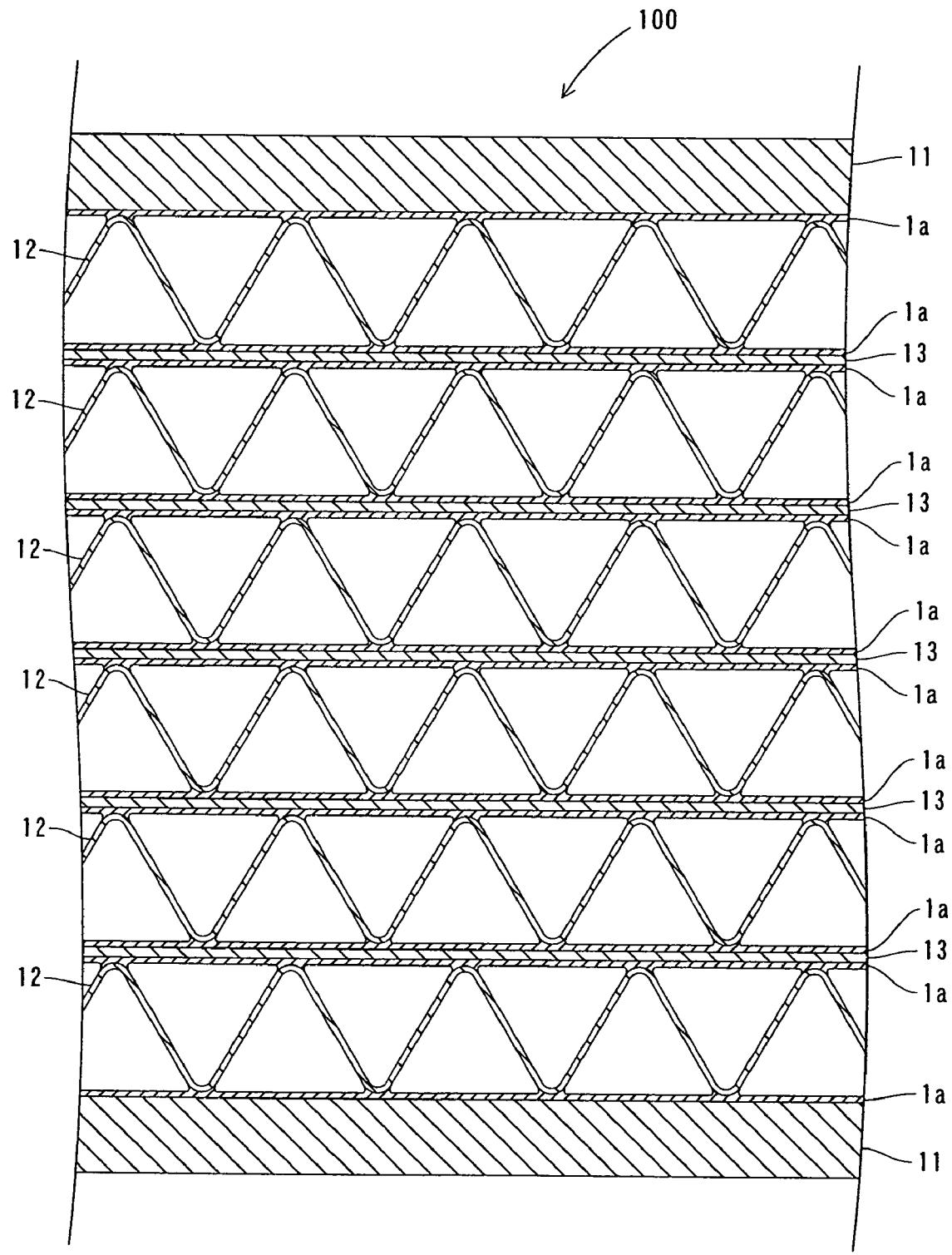
FIG. 2 A sectional view partially showing a heat exchanger formed with the brazing filler metal according to the first embodiment shown in FIG. 1.
Figure 3:
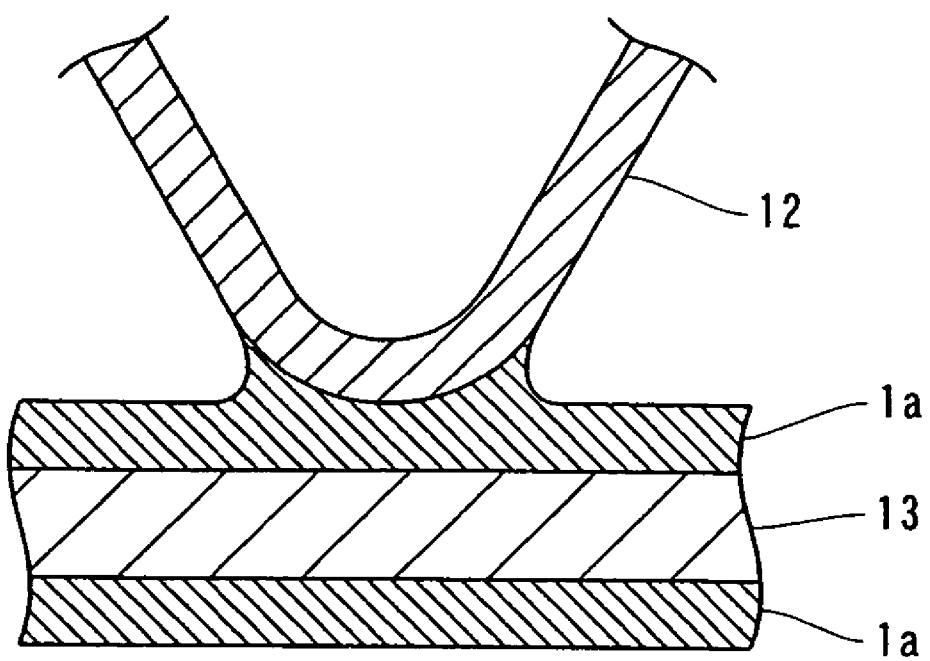
FIG. 3 An enlarged sectional view showing a bonded portion of the heat exchanger according to the first embodiment shown in FIG. 2.

The structure of a heat exchanger 100 formed with the brazing filler metal 1 according to the first embodiment of the present invention is now described with reference to FIGS. 2 and 3. The first embodiment is described with reference to an example of applying a brazed structure of the present invention to the heat exchanger 100.

The heat exchanger 100 formed with the brazing filler metal 1 according to the first embodiment comprises a pair of plates 11 made of stainless steel, six wavy fins 12 made of stainless steel and five plates 13 made of stainless steel. The plates 13 are examples of the "substrate" in the present invention. Further, it is possible to employ SUS410 or SUS430 which is ferritic stainless steel or SUS304 or SUS316 which is austenitic stainless steel as the stainless steel. The pair of plates 11 constitute an outer frame of the heat exchanger 100. The six fins 12 and the five plates 13 are arranged to be alternately stacked between the pair of plates 11. The interior of the heat exchanger 100 is divided into six layers with the five plates 13, and is so constituted that exhaust gas and water alternately flow through the six layers every layer. The fins 12 are provided for retarding the rates of flow of the exhaust gas and the water flowing through the six layers.

According to the first embodiment, the heat exchanger 100 includes Ti—Ni—Cr alloys 1a formed by brazing/bonding described later between the fins 12 and the plates 13 and 11. In other words, a plate 13 and a pair of Ti—Ni—Cr alloys 1a are formed between each adjacent pair of fins 12, while the Ti—Ni—Cr alloys 1a are formed between the plates 11 and the fins 12. These Ti—Ni—Cr alloys 1a have a function of bonding the outer peripheral surfaces of bent portions of the fins 12 and the plates 13 and 11 (see FIG. 2) to each other, as shown in FIG. 3. The content of Cr in the Ti—Ni—Cr alloys 1a is at least about 11 mass %. Assuming that the sum of the Ti content and the Ni content in the Ti—Ni—Cr alloys 1a is 100 mass %, the Ni content in the Ti—Ni—Cr alloys 1a is at least 59.5% mass % and not more than 70.0 mass %, and preferably about 64.4 mass % forming a eutectic composition of Ti—Ni alloys in the Ti—Ni—Cr alloys 1a after brazing. According to the first embodiment, the temperature of the exhaust gas flowing through the interior of the heat exchanger 100 (see FIG. 2) is about 700° C. The exhaust gas and the water alternately flowing through the six layers formed in the heat exchanger 100 every layer perform heat exchange through the plates 13 and the pairs of Ti—Ni—Cr alloys 1a so that heat of the exhaust gas is transmitted to the water, whereby the water is heated into warm water.

Eutectic reaction utilized when forming the heat exchanger 100 with the brazing filler metal 1 according to the first embodiment is described with reference to FIGS. 2 to 7. The eutectic reaction is such reaction that at least two types of solid phases simultaneously precipitate/solidify or melt when at least two types of alloys are cooled from melted states or melted from solid states.

Figure 4:
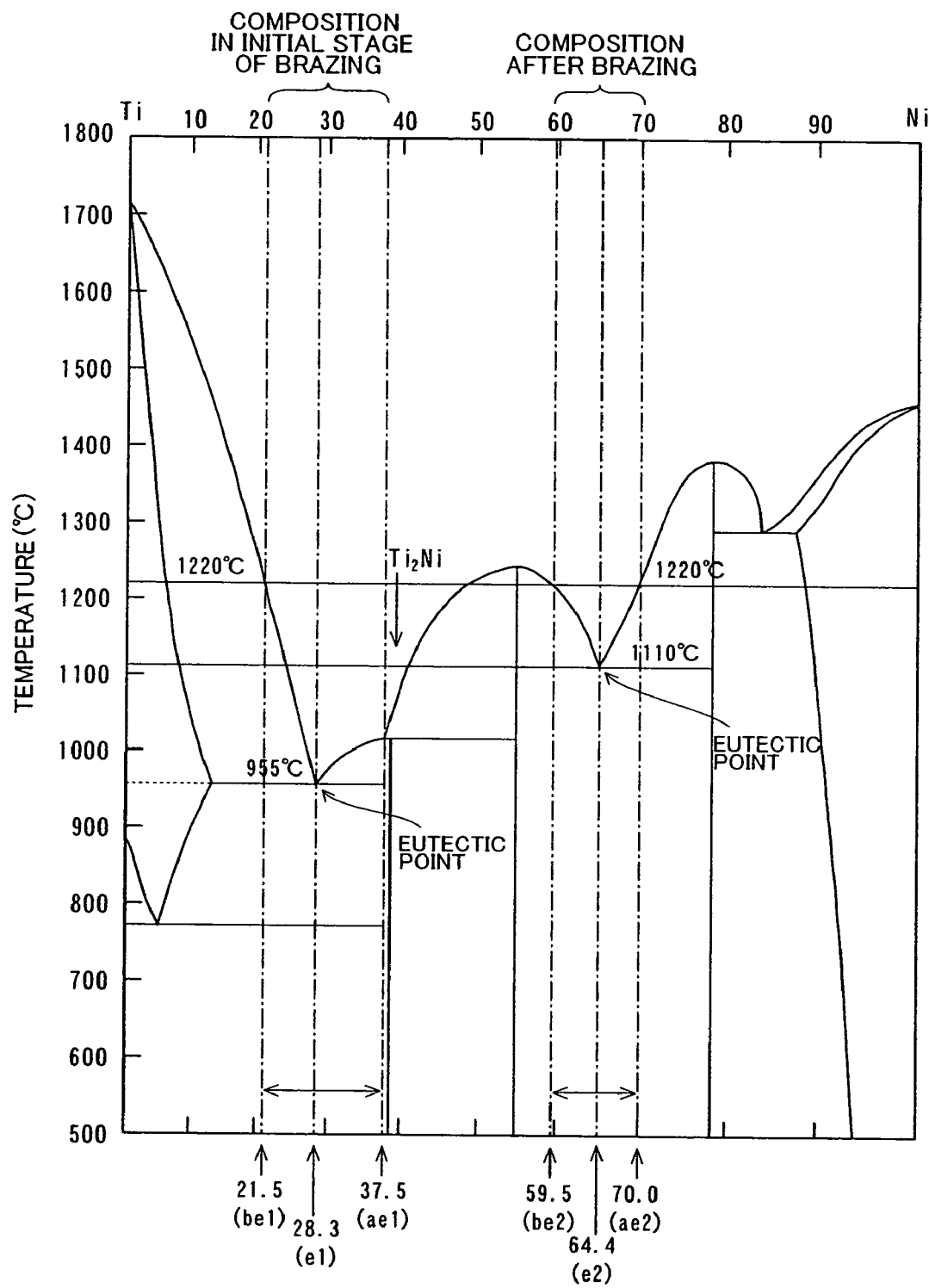
FIG. 4 A state graph of an Ni—Ti-based alloy.
Figure 5:
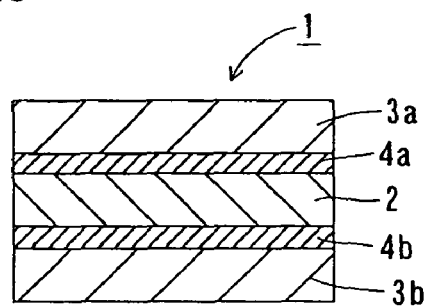
FIG. 5 A model diagram for illustrating eutectic reaction of the brazing filler metal according to the first embodiment shown in FIG. 1.

States of an Ni—Ti-based alloy are now described. The temperatures of eutectic points of the Ni—Ti-based alloy in an initial stage of brazing and after brazing are about 955° C. and about 1110° C. respectively, as shown in FIG. 4. Further, a eutectic composition e1 of the Ni—Ti-based alloy at about 955° C. in the initial stage of brazing is about 28.3 mass % Ni—about 71.7 mass % Ti, and a eutectic composition e2 of the Ni—Ti-based alloy at about 1110° C. after brazing is about 64.4 mass % Ni—about 35.6 mass % Ti. It is shown that a composition range melting in a state of not more than about 1220° C. while generating no intermetallic compound consisting of $Ti_2Ni$ in the initial stage of brazing is about 21.5 mass % Ni—about 78.5 mass % Ti (be1) to about 37.5 mass % Ni—about 62.5 mass % (ae1). Further, it is shown that a composition range melting in a state of not more than about 1220° C. after brazing is about 59.5 mass % Ni—about 40.5 mass % Ti (be2) to about 70.0 mass % Ni—about 30.0 mass % (ae2). In other words, the Ni content in the Ni layer 4a (4b) in the case of setting the sum of the Ti content in the Ti layer 3a (3b) and the Ni content in the Ni layer 4a (4b) to 100 mass % is set to the aforementioned range of at least 21.5 mass % and not more than 37.5 mass % on the basis of the range of be1 to ae1 including the eutectic composition e1 of the Ti—Ni alloy in the initial stage of brazing according to the first embodiment. Further, the Ni content in the Ti—Ni—Cr alloys 1a in the case of setting the sum of the Ti content in the Ti—Ni—Cr alloys 1a and the Ni content in the Ti—Ni—Cr alloys 1a to 100 mass % is set to the aforementioned range of at least about 59.5 mass % and not more than 70.0 mass %.

Figure 6:
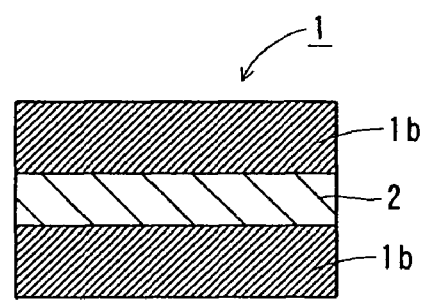
FIG. 6 A model diagram for illustrating eutectic reaction of the brazing filler metal according to the first embodiment shown in FIG. 1.
Figure 7:
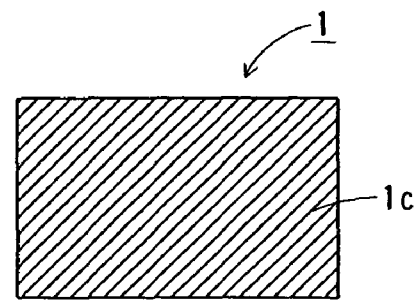
FIG. 7 A model diagram for illustrating eutectic reaction of the brazing filler metal according to the first embodiment shown in FIG. 1.

As the principle of brazing according to the first embodiment, the brazing filler metal consisting of the Ni—Cr alloy layer 2, the Ni layers 4a and 4b arranged on the side of the first surface and on the side of the second surface of the Ni—Cr alloy layer 2 respectively and the Ti layers 3a and 3b arranged on the outer surfaces of the Ni layers 4a and 4b respectively is heated to not more than about 1220° C. Thus, the Ti layer 3a (3b) and the Ni layer 4a (4b) in the composition range of be1 to ae1 (see FIG. 4) located on the side of the surface of the brazing filler metal shown in FIG. 5 first react with each other and melt in the initial stage of brazing, whereby Ti—Ni liquid phases 1b shown in FIG. 6 are formed. Then, the Ti—Ni liquid phases 1b which are in melted states react with the Ni—Cr alloy layer 2, so that a Ti—Ni—Cr liquid phase 1c shown in FIG. 7 is formed. At this time, Ni in the Ni—Cr alloy layer 2 melts into the Ti—Ni liquid phases 1b. Therefore, the Ni content in the Ti—Ni liquid phases 1b increases, whereby the composition ratio between the Ni content and the Ti content in the Ti—Ni—Cr liquid phase 1c after brazing is in the composition range of be2 to ae2 (see FIG. 4). Thereafter the temperature of the Ti—Ni—Cr liquid phase 1c in the melted state is reduced to 1110° C., whereby the Ti—Ni—Cr liquid phase 1c shown in FIG. 7 changes to the Ti—Ni—Cr alloys 1a (see FIGS. 2 and 3).

Brazing/bonding performed with the brazing filler metal 1 according to the first embodiment of the present invention is described with reference to FIGS. 1 to 9.

Figure 8:
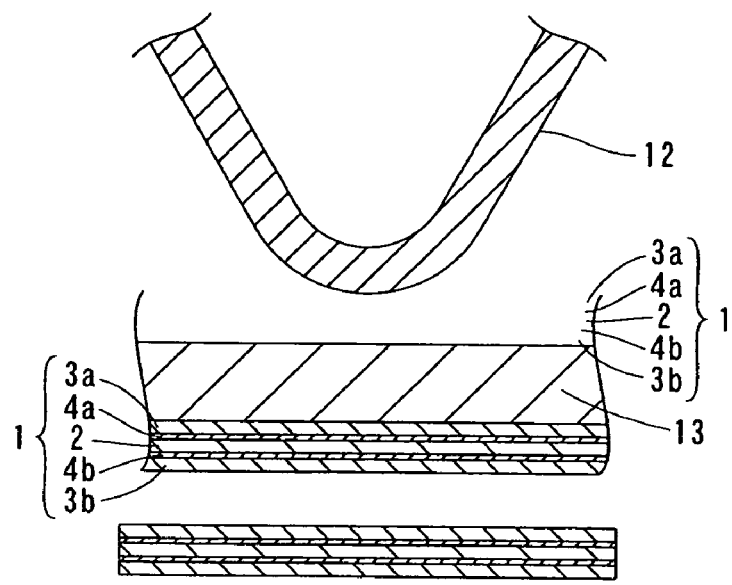
FIG. 8 A sectional view for illustrating a step of brazing/bonding at the time of forming the heat exchanger according to the first embodiment shown in FIG. 2.

First, the brazing filler metal 1 (see FIG. 1) is arranged between the plates 11 (see FIG. 2) and the fins 12 (see FIG. 2), while the brazing filler metal 1 is arranged between each fin 12 and each plate 13 as shown in FIG. 8. At this time, the outer peripheral surface of each bent portion of the fin 12 and the Ti layer 3a constituting the brazing filler metal 1 are in contact with each other, while the plate 13 and the Ti layer 3b constituting the brazing filler metal 1 are in contact with each other. From this state, the whole is heated in inert gas or in a vacuum at a temperature of at least about 1110° C. and not more than about 1220° C. for about 10 minutes.

Figure 9:
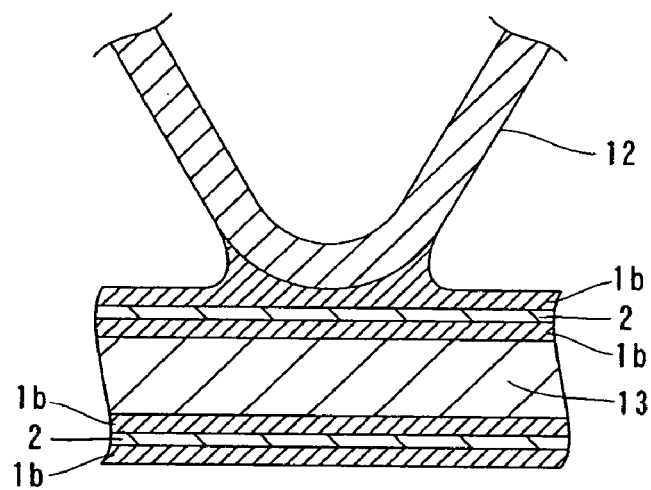
FIG. 9 A sectional view for illustrating another step of brazing/bonding at the time of forming the heat exchanger according to the first embodiment shown in FIG. 2.

At this time, the Ti layer 3a (Ti layer 3b) and the Ni layer 4a (Ni layer 4b) constituting the brazing filler metal 1 (see FIGS. 1 and 5) first change from the solid phase state to a liquid phase state so that the Ti—Ni liquid phases 1b (see FIG. 6) (composition range: be1 to ae1 (see FIG. 4)) are formed, as shown in FIG. 9. Thereafter the Ti—Ni liquid phases 1b in the liquid phase state react with the Ni—Cr alloy layer 2, to form the Ti—Ni—Cr liquid phase 1c (see FIG. 7) in the composition range be2 to ae2 (see FIG. 4). When the temperature so lowers after brazing that the temperature of the Ti—Ni—Cr liquid phase 1c lowers, the Ti—Ni—Cr liquid phase 1c changes from the liquid phase state to the Ti—Ni—Cr alloys 1a (see FIGS. 2 and 3) in the composition range be2 to ae2 (see FIG. 4) which is the solid phase state. Consequently, the outer peripheral surfaces of the bent portions of the fins 12 and the plates 13 and 11 are brazed/bonded to each other through the Ti—Ni—Cr alloys 1a, whereby the heat exchanger 100 shown in FIG. 2 is formed.

According to the first embodiment, as hereinabove described, the brazing filler metal is so constituted of the Ni—Cr alloy layer 2, the Ti layers 3a and 3b and the Ni layers 4a and 4b that the Ti—Ni—Cr alloys 1a are formed on portions bonded by brazing/bonding, whereby oxide films (passive films) of $Cr_2O_3$ can be easily formed on the surfaces of the bonded portions. Thus, oxidation resistance of the portions bonded by brazing/bonding can be improved.

According to the first embodiment, the brazing filler metal is so constituted of the Ni—Cr alloy layer 2, the Ti layers 3a and 3b and the Ni layers 4a and 4b that corrosion resistance of the portions bonded by brazing/bonding can be improved since Ti, Ni and Cr having high corrosion resistance are contained in the portions bonded by brazing/bonding.

According to the first embodiment, the Ni layer 4a (Ni layer 4b) is so arranged between the Ni—Cr alloy layer 2 and the Ti layer 3a (Ti layer 3b) that a time when Ti contained in the Ti layers 3a and 3b and Cr contained in the Ni—Cr alloy layer 2 mix with each other can be reduced in a process of performing brazing/bonding. Thus, it is possible to suppress formation of fragile $TiCr_2$ through reaction between Ti contained in the Ti layers 3a and 3b and Cr contained in the Ni—Cr alloy layer 2, whereby the portions bonded by brazing/bonding can be inhibited from becoming fragile.

According to the first embodiment, the Ni content in the Ni layers 4a and 4b is so set to at least 21.5 mass % in the case of setting the sum of the Ti content in the Ti layers 3a and 3b and the Ni content in the Ni layers 4a and 4b to 100 mass % that the Ti layers 3a and 3b and the Ni layers 4a and 4b can be melted at a temperature of not more than about 1220° C. Thus, Ti in the Ti layers 3a and 3b and Ni in the Ni layers 4a and 4b can be melted without employing a specific furnace outputting a high temperature of at least about 1220° C.

According to the first embodiment, the Ni content in the Ni layers 4a and 4b is so set to not more than 37.5 mass % in the case of setting the sum of the Ti content in the Ti layers 3a and 3b and the Ni content in the Ni layers 4a and 4b to 100 mass % that portions bonded by brazing/bonding can be inhibited from formation of intermetallic compounds consisting of $Ti_2Ni$, dissimilarly to a case of increasing the Ni content beyond 37.5 mass %. Consequently, formation of fragile $Ti_2Ni$ on the brazed/bonded portions can be suppressed, whereby strength of the portions bonded by brazing/bonding can be inhibited from lowering.

According to the first embodiment, the Ni content in the Ti—Ni—Cr alloys 1a is so set to about 64.4 mass % in the case of setting the sum of the Ti content in the Ti—Ni—Cr alloys 1a an the Ni content in the Ti—Ni—Cr alloys 1a to 100 mass % that Ti—Ni alloys of the eutectic composition e2 can be obtained in the Ti—Ni—Cr alloys 1a after brazing, whereby the Ti—Ni—Cr liquid phase 1c (see FIG. 7) which is in the liquid phase state can be converted to the Ti—Ni—Cr alloys 1a (see FIGS. 2 an 3) of the solid phase state without through a solid-liquid existence state at about 1110° C. (see FIG. 4) which is the eutectic temperature of the Ti—Ni alloy. Therefore, the Ti—Ni—Cr liquid phase 1c can be homogeneously solidified by reducing the temperature thereof below about 1110° C. which is the eutectic temperature. Further, no solid-liquid coexistence state is present in the Ti—Ni—Cr liquid phase 1c in the process of brazing/bonding, whereby fluidity (wettability) of the Ti—Ni—Cr liquid phase 1c can be inhibited from lowering dissimilarly to a case where the Ti—Ni—Cr liquid phase 1c is in a solid-liquid coexistence state. Consequently, the brazing filer metal 1 consisting of the Ti—Ni—Cr liquid phase 1c can be easily flown to the bonded portions.

Second Embodiment

Referring to FIGS. 2 to 4 and FIGS. 10 to 12, such a brazing composite material 50 that brazing filler metals 51 consisting of three-layer structures are rolled/bonded to a substrate 13 is described in this second embodiment, dissimilarly to the aforementioned first embodiment.

Figure 10:
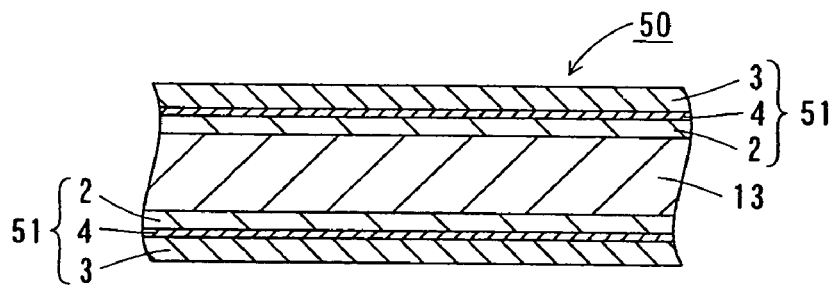
FIG. 10 A sectional view showing the structure of a brazing composite material according to a second embodiment of the present invention.

The brazing composite material 50 according to the second embodiment of the present invention comprises a plate 13 made of stainless steel and a pair of brazing filler metals 51 rolled/bonded to first and second surfaces of the plate 13, as shown in FIG. 10.

According to the second embodiment, the pair of brazing filler metals 51 are constituted of three-layer structures of Ni—Cr alloy layers 2 rolled/bonded to the plate 13, Ti layers 3 and Ni layers 4 arranged between the Ni—Cr alloy layers 2 and the Ti layers 3 respectively. Assuming that the sum of the Ti content in the Ti layers 3 and the Ni content in the Ni layers 4 is 100 mass %, the Ni content in the Ni layers 4 is at least 21.5 mass % and not more than 37.5 mass %, and preferably about 28.3 mass % forming a eutectic composition of a Ti—Ni alloy in an initial stage of brazing. Therefore, the Ti layers 3 and the Ni layers 4 may cause eutectic reaction around about 955° C. (see FIG. 4) when rolling/bonding the brazing filler metals 51 constituted of the three-layer structures of the Ni—Cr alloy layers 2, the Ti layers 3 and the Ni layers 4 to the plate 13, and hence the condition for rolling/bonding the brazing filler metals 51 to the plate 13 is less than about 955° C. When rolling/bonding the brazing filler metals 51 to a substrate 13 of SUS304 or SUS316 which is austenitic stainless steel, the austenitic stainless steel must be annealed at a temperature of at least 1050° C., not to cause sigma brittleness (embrittlement). In this case, it is difficult to make the Ti layers 3 and the Ni layers 4 cause no eutectic reaction and to make the austenitic stainless steel cause no sigma brittleness, and hence it is unpreferable to employ austenitic stainless steel as the substrate 13 in this second embodiment. According to this second embodiment, therefore, it is preferable to employ a substrate 13 of ferritic stainless steel such as SUS430 or SUS410.

Figure 11:
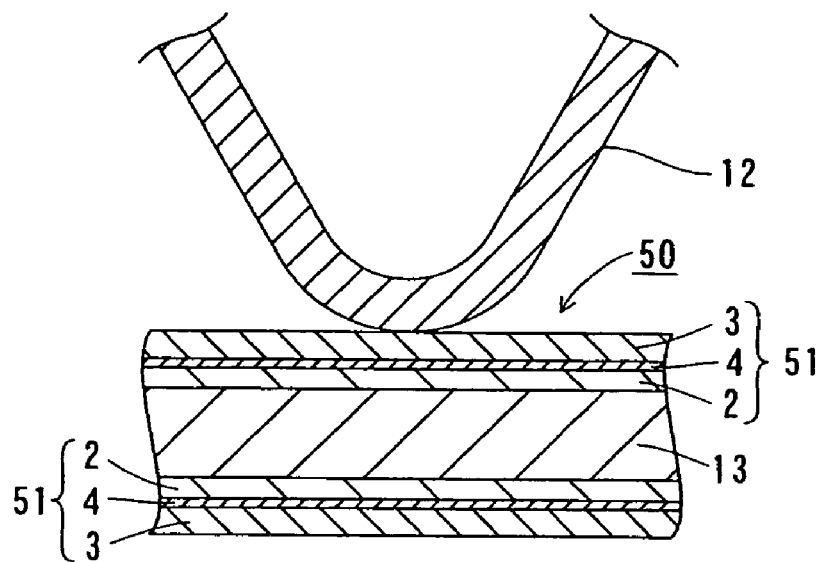
FIG. 11 A sectional view for illustrating a step of brazing/bonding at the time of forming a heat exchanger according to the second embodiment shown in FIG. 10.
Figure 12:
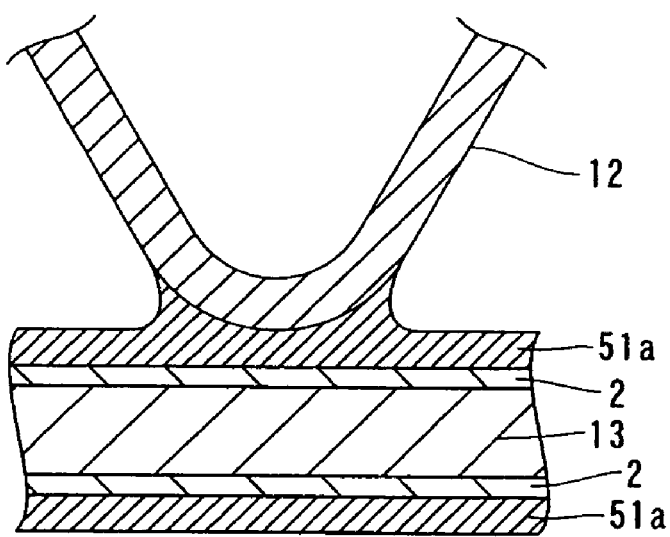
FIG. 12 A sectional view for illustrating another step of brazing/bonding at the time of forming the heat exchanger according to the second embodiment shown in FIG. 10.

In order to form a heat exchanger 100 (see FIG. 2) with the brazing filler metals 51 according to the second embodiment, the brazing composite material 50 is arranged to come into contact with each bent portion of each fin 12, as shown in FIG. 11. Then, brazing/bonding is performed under conditions (performing heating in inert gas or in a vacuum at a temperature of at least about 1110° C. and not more than about 1220° C. for about 10 minutes) similar to those for the brazing/bonding performed in the aforementioned first embodiment. At this time, the Ti layers 3 and the Ni layers 4 constituting the brazing filler metals 51 change from a solid phase state to a liquid phase state so that Ti—Ni liquid phases 51a in the range of be1 to ae1 (see FIG. 4) are formed, as shown in FIGS. 11 and 12. Thereafter the Ti—Ni liquid phases 51a react with the Ni—Cr alloy layers 2, so that Ti—Ni—Cr alloys 1a (see FIGS. 2 and 3) in the composition range of be2 to ae2 (see FIG. 4) are formed. When the temperature of these Ti—Ni—Cr alloys 1a reaches a level around about 1110° C. (see FIG. 4) which is a eutectic point, the Ti—Ni—Cr alloys 1a change from a melted state to a solid state. Consequently, the outer peripheral surface of the bent portion of the fin 12 and plates 11 and 13 are brazed/bonded to each other through the Ti—Ni—Cr alloys 1a so that the heat exchanger is formed.

The effect of the second embodiment is similar to that of the aforementioned first embodiment.

EXAMPLES 1 TO 9

A comparative experiment conducted for confirming the effect (effect of improving oxidation resistance of portions bonded by brazing/bonding) of the aforementioned first embodiment of the present invention is now described. In this comparative experiment, compositions of reaction layers (portions bonded by brazing/bonding) of cladding materials according to Examples 1 to 9 corresponding to the aforementioned first embodiment formed with brazing filler metals of five-layer structures consisting of Ni—Cr alloy layers, pure Ni layers rolled/bonded to first and second surfaces of the Ni—Cr alloy layers and pure Ti rolled/bonded to the pure Ni layers and reaction layers (portions bonded by brazing/bonding) of cladding materials according to comparative examples 1 to 4 formed with brazing filler metals having different thicknesses from the aforementioned Examples 1 to 9 were compared with each other. Further, oxidation resistance of the reaction layers (portions bonded by brazing/bonding) of the cladding materials according to Examples 1 to 9 and comparative examples 1 to 4 was evaluated by calculating oxidative weight increases of the reaction layers (portions bonded by brazing/bonding) of the cladding materials according to Examples 1 to 9 and comparative examples 1 to 4 and comparing the same with each other. This is now described in detail.

[Preparation of Brazing Filler Metal]

Example 1

An Ni—Cr alloy layer containing 60 mass % of Ni and 40 mass % of Cr, pure Ni layers and pure Ti layers were employed as raw materials for the brazing filler metal. The pure Ni layers were rolled/bonded to first and second surfaces of the Ni—Cr alloy layer respectively, and diffusion annealing was thereafter performed under an argon atmosphere at a temperature of 800° C. for one minute. The thicknesses of the Ni—Cr alloy layer and the pure Ni layers were adjusted to 25.0 µm and 2.1 µm respectively by performing finish rolling and annealing. Further, the pure Ti layers were rolled/bonded to the pure Ni layers rolled/bonded to both surfaces of the Ni—Cr alloy layer respectively, and diffusion annealing was thereafter performed under an argon atmosphere at a temperature of 800° C. for one minute. The thicknesses of the pure Ti layers were adjusted to 10.4 µm respectively by performing finish rolling and annealing, thereby preparing the brazing filler metal according to Example 1 having a five-layer structure of pure Ti layer/pure Ni layer/Ni—Cr alloy layer/pure Ni layer/pure Ti layer. Thus, the content (mass %) of Ni in the pure Ni layers with respect to the sum of Ti in the pure Ti layers and Ni in the pure Ni layers before brazing was made to reach the eutectic composition e1 (about 28.3 mass %), while the content (mass %) of Ni in the Ti—Ni—Cr alloy with respect to the sum of Ti and Ni in the Ti—Ni—Cr alloy after brazing was made to reach the eutectic composition e2 (about 64.4 mass %).

Example 2

The brazing filler metal according to Example 2 having a five-layer structure of pure Ti layer/pure Ni layer/Ni—Cr alloy layer/pure Ni layer/pure Ti layer was prepared similarly to the aforementioned Example 1, except that the thicknesses of the respective ones of the Ni—Cr alloy layer, the pure Ni layers and the pure Ti layers were adjusted to 23.4 µm, 1.6 µm and 11.7 µm by performing finish rolling and annealing. Thus, the content (mass %) of Ni in the pure Ni layers with respect to the sum of Ti in the pure Ti layers and Ni in the pure Ni layers before brazing was made to reach the eutectic composition be1 (about 21.5 mass %), while the content (mass %) of Ni in the Ti—Ni—Cr alloy with respect to the sum of Ti and Ni in the Ti—Ni—Cr alloy after brazing was made to reach the eutectic composition be2 (about 59.5 mass %).

Example 3

The brazing filler metal according to Example 3 having a five-layer structure of pure Ti layer/pure Ni layer/Ni—Cr alloy layer/pure Ni layer/pure Ti layer was prepared similarly to the aforementioned Example 1, except that the thicknesses of the respective ones of the Ni—Cr alloy layer, the pure Ni layers and the pure Ti layers were adjusted to 30.2 µm, 1.2 µm and 8.7 µm by performing finish rolling and annealing. Thus, the content (mass %) of Ni in the pure Ni layers with respect to the sum of Ti in the pure Ti layers and Ni in the pure Ni layers before brazing was made to reach the eutectic composition be1 (about 21.5 mass %), while the content (mass %) of Ni in the Ti—Ni—Cr alloy with respect to the sum of Ti and Ni in the Ti—Ni—Cr alloy after brazing was made to reach the eutectic composition ae2 (about 70.0 mass %).

Example 4

The brazing filler metal according to Example 4 having a five-layer structure of pure Ti layer/pure Ni layer/Ni—Cr alloy layer/pure Ni layer/pure Ti layer was prepared similarly to the aforementioned Example 1, except that the thicknesses of the respective ones of the Ni—Cr alloy layer, the pure Ni layers and the pure Ti layers were adjusted to 19.2 μm, 3.4 μm and 12.0 μm by performing finish rolling and annealing. Thus, the content (mass %) of Ni in the pure Ni layers with respect to the sum of Ti in the pure Ti layers and Ni in the pure Ni layers before brazing was made to reach the eutectic composition ae1 (about 37.5 mass %), while the content (mass %) of Ni in the Ti—Ni—Cr alloy with respect to the sum of Ti and Ni in the Ti—Ni—Cr alloy after brazing was made to reach the eutectic composition be2 (about 59.5 mass %).

Example 5

The brazing filler metal according to Example 5 having a five-layer structure of pure Ti layer/pure Ni layer/Ni—Cr alloy layer/pure Ni layer/pure Ti layer was prepared similarly to the aforementioned Example 1, except that the thicknesses of the respective ones of the Ni—Cr alloy layer, the pure Ni layers and the pure Ti layers were adjusted to 26.8 μm, 2.5 μm and 9.1 μm by performing finish rolling and annealing. Thus, the content (mass %) of Ni in the pure Ni layers with respect to the sum of Ti in the pure Ti layers and Ni in the pure Ni layers before brazing was made to reach the eutectic composition ae1 (about 37.5 mass %), while the content (mass %) of Ni in the Ti—Ni—Cr alloy with respect to the sum of Ti and Ni in the Ti—Ni—Cr alloy after brazing was made to reach the eutectic composition ae2 (about 70.0 mass %).

Example 6

The brazing filler metal according to Example 6 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 80 mass % of Ni and 20 mass % of Cr was employed as a raw material for the brazing filler metal and the thicknesses of the respective ones of the Ni—Cr alloy layer, the pure Ni layers and the pure Ti layers were adjusted to 21.6 μm, 2.4 μm and 11.8 μm by performing finish rolling and annealing. Thus, the content (mass %) of Ni in the pure Ni layers with respect to the sum of Ti in the pure Ti layers and Ni in the pure Ni layers before brazing was made to reach the eutectic composition e1 (about 28.3 mass %), while the content (mass %) of Ni in the Ti—Ni—Cr alloy with respect to the sum of Ti and Ni in the Ti—Ni—Cr alloy after brazing was made to reach the eutectic composition e2 (about 64.4 mass %).

Example 7

The brazing filler metal according to Example 7 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 80 mass % of Ni and 20 mass % of Cr was employed as a raw material for the brazing filler metal and the thicknesses of the respective ones of the Ni—Cr alloy layer, the pure Ni layers and the pure Ti layers were adjusted to 20.6 μm, 1.8 μm and 12.9 μm by performing finish rolling and annealing. Thus, the content (mass %) of Ni in the pure Ni layers with respect to the sum of Ti in the pure Ti layers and Ni in the pure Ni layers before brazing was made to reach the eutectic composition be1 (about 21.5 mass %), while the content (mass %) of Ni in the Ti—Ni—Cr alloy with respect to the sum of Ti and Ni in the Ti—Ni—Cr alloy after brazing was made to reach the eutectic composition be2 (about 59.5 mass %).

Example 8

The brazing filler metal according to Example 8 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 80 mass % of Ni and 20 mass % of Cr was employed as a raw material for the brazing filler metal and the thicknesses of the respective ones of the Ni—Cr alloy layer, the pure Ni layers and the pure Ti layers were adjusted to 26.6 μm, 1.4 μm and 10.3 μm by performing finish rolling and annealing. Thus, the content (mass %) of Ni in the pure Ni layers with respect to the sum of Ti in the pure Ti layers and Ni in the pure Ni layers before brazing was made to reach the eutectic composition be1 (about 21.5 mass %), while the content (mass %) of Ni in the Ti—Ni—Cr alloy with respect to the sum of Ti and Ni in the Ti—Ni—Cr alloy after brazing was made to reach the eutectic composition ae2 (about 70.0 mass %).

Example 9

The brazing filler metal according to Example 9 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 80 mass % of Ni and 20 mass % of Cr was employed as a raw material for the brazing filler metal and the thicknesses of the respective ones of the Ni—Cr alloy layer, the pure Ni layers and the pure Ti layers were adjusted to 23.2 μm, 2.9 μm and 10.5 μm by performing finish rolling and annealing. Thus, the content (mass %) of Ni in the pure Ni layers with respect to the sum of Ti in the pure Ti layers and Ni in the pure Ni layers before brazing was made to reach the eutectic composition ae1 (about 37.5 mass %), while the content (mass %) of Ni in the Ti—Ni—Cr alloy with respect to the sum of Ti and Ni in the Ti—Ni—Cr alloy after brazing was made to reach the eutectic composition ae2 (about 70.0 mass %).

COMPARATIVE EXAMPLE 1

The brazing filler metal according to comparative example 1 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 80 mass % of Ni and 20 mass % of Cr was employed as a raw material for the brazing filler metal and the thicknesses of the respective ones of the Ni—Cr alloy layer, the pure Ni layers and the pure Ti layers were adjusted to 16.4 μm, 3.7 μm and 13.1 μm by performing finish rolling and annealing. Thus, the content (mass %) of Ni in the pure Ni layers with respect to the sum of Ti in the pure Ti layers and Ni in the pure Ni layers before brazing was made to reach the eutectic composition ae1 (about 37.5 mass %), while the content (mass %) of Ni in the Ti—Ni—Cr alloy with respect to the sum of Ti and Ni in the Ti—Ni—Cr alloy after brazing was made to reach the eutectic composition be2 (about 59.5 mass %).

COMPARATIVE EXAMPLE 2

The brazing filler metal according to comparative example 2 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 60 mass % of Ni and 40 mass % of Cr was employed as a raw material for the brazing filler metal and the thicknesses of the respective ones of the Ni—Cr alloy layer, the pure Ni layers and the pure Ti layers were adjusted to 27.4 μm, 1.2 μm and 10.1 μm by performing finish rolling and annealing. Thus, the content (mass %) of Ni in the pure Ni layers with respect to the sum of Ti in the pure Ti layers and Ni in the pure Ni layers before brazing was made to reach the eutectic composition be1 (about 21.5 mass %), while the content (mass %) of Ni in the Ti—Ni—Cr alloy with respect to the sum of Ti and Ni in the Ti—Ni—Cr alloy after brazing was made to reach the eutectic composition e2 (about 64.4 mass %).

COMPARATIVE EXAMPLE 3

The brazing filler metal according to comparative example 3 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 60 mass % of Ni and 40 mass % of Cr was employed as a raw material for the brazing filler metal and the thicknesses of the respective ones of the Ni—Cr alloy layer, the pure Ni layers and the pure Ti layers were adjusted to 30.8 μm, 1.6 μm and 8.0 μm by performing finish rolling and annealing. Thus, the content (mass %) of Ni in the pure Ni layers with respect to the sum of Ti in the pure Ti layers and Ni in the pure Ni layers before brazing was made to reach the eutectic composition e1 (about 28.3 mass %), while the content (mass %) of Ni in the Ti—Ni—Cr alloy with respect to the sum of Ti and Ni in the Ti—Ni—Cr alloy after brazing was made to reach the eutectic composition ae2 (about 70.0 mass %).

COMPARATIVE EXAMPLE 4

The brazing filler metal according to comparative example 2 having a five-layer structure of pure Ti layer/pure Ni layer/Ni—Cr alloy layer/pure Ni layer/pure Ti layer was prepared similarly to the aforementioned Example 1, except that an Ni—Cr alloy layer containing 60 mass % of Ni and 40 mass % of Cr was employed as a raw material for the brazing filler metal and the thicknesses of the respective ones of the Ni—Cr alloy layer, the pure Ni layers and the pure Ti layers were adjusted to 18.8 μm, 2.6 μm and 13.0 μm by performing finish rolling and annealing. Thus, the content (mass %) of Ni in the pure Ni layers with respect to the sum of Ti in the pure Ti layers and Ni in the pure Ni layers before brazing was made to reach the eutectic composition e1 (about 28.3 mass %), while the content (mass %) of Ni in the Ti—Ni—Cr alloy with respect to the sum of Ti and Ni in the Ti—Ni—Cr alloy after brazing was made to reach the eutectic composition be2 (about 59.5 mass %).

The following Tables 1 to 3 show the correspondent relations between the thicknesses (μm) of the respective layers of the aforementioned brazing filler metals and the composition (mass %) ratios between the pure Ti layers and the pure Ni layers calculated on the basis of the thicknesses of the respective layers of the brazing filler metals. 40% Cr—Ni alloy layers were employed in Examples 1 to 5 shown in Table 1, while 20% Cr—Ni alloy layers were employed in Examples 6 to 9 shown in Table 2. A 20% Cr—Ni alloy layer was employed in comparative example in Table 3, while 40% Cr—Ni alloy layers were employed in comparative examples 2 to 4.

TABLE 1

| | Thickness of Layer (μm) | | | | | Ratio Between Pure Ti Layer and Pure Ni Layer (mass %) | |
|---|---|---|---|---|---|---|---|
| | Pure Ti Layer | Pure Ni Layer | 40% Cr—Ni Alloy Layer | Pure Ni Layer | Pure Ti Layer | Pure Ti Layer | Pure Ni Layer |
| Example 1 | 10.4 | 2.1 | 25.0 | 2.1 | 10.4 | 71.7 | 28.3 |
| Example 2 | 11.7 | 1.6 | 23.4 | 1.6 | 11.7 | 78.7 | 21.3 |
| Example 3 | 8.7 | 1.2 | 30.2 | 1.2 | 8.7 | 78.6 | 21.4 |
| Example 4 | 12.0 | 3.4 | 19.2 | 3.4 | 12.0 | 64.1 | 35.9 |
| Example 5 | 9.1 | 2.5 | 26.8 | 2.5 | 9.1 | 64.7 | 35.3 |

TABLE 2

| | Thickness of Layer (μm) | | | | | Ratio Between Pure Ti Layer and Pure Ni Layer (mass %) | |
|---|---|---|---|---|---|---|---|
| | Pure Ti Layer | Pure Ni Layer | 20% Cr—Ni Alloy Layer | Pure Ni Layer | Pure Ti Layer | Pure Ti Layer | Pure Ni Layer |
| Example 6 | 11.8 | 2.4 | 21.6 | 2.4 | 11.8 | 71.3 | 28.7 |
| Example 7 | 12.9 | 1.8 | 20.6 | 1.8 | 12.9 | 78.4 | 21.6 |
| Example 8 | 10.3 | 1.4 | 26.6 | 1.4 | 10.3 | 78.8 | 21.2 |
| Example 9 | 10.5 | 2.9 | 23.2 | 2.9 | 10.5 | 64.7 | 35.3 |

TABLE 3

| | Thickness of Layer (μm) | | | | | Ratio Between Pure Ti Layer and Pure Ni Layer (mass %) | |
|---|---|---|---|---|---|---|---|
| | Pure Ti Layer | Pure Ni Layer | Cr—Ni Alloy Layer | Pure Ni Layer | Pure Ti Layer | Pure Ti Layer | Pure Ni Layer |
| Comparative Example 1 | 13.1 | 3.7 | 16.4 (20% Cr—Ni) | 3.7 | 13.1 | 64.1 | 35.9 |

TABLE 3-continued

|  | Thickness of Layer (μm) | | | | | Ratio Between Pure Ti Layer and Pure Ni Layer (mass %) | |
| --- | --- | --- | --- | --- | --- | --- | --- |
|  | Pure Ti Layer | Pure Ni Layer | Cr—Ni Alloy Layer | Pure Ni Layer | Pure Ti Layer | Pure Ti Layer | Pure Ni Layer |
| Comparative Example 2 | 10.1 | 1.2 | 27.4 (40% Cr—Ni) | 1.2 | 10.1 | 81.0 | 19.0 |
| Comparative Example 3 | 8.0 | 1.6 | 30.8 (40% Cr—Ni) | 1.6 | 8.0 | 71.7 | 28.3 |
| Comparative Example 4 | 13.0 | 2.6 | 18.8 (40% Cr—Ni) | 2.6 | 13.0 | 71.7 | 28.3 |

[Composition Analysis of Reaction Layer of Cladding Material]

(Common to Examples 1 to 9 and Comparative Examples 1 to 4)

Then, the compositions of reaction layers of cladding materials obtained by reacting the brazing filler metals according to Examples 1 to 9 and comparative examples 1 to 4 prepared in the aforementioned manner were analyzed. More specifically, the brazing filler metals according to Examples 1 to 9 and comparative examples 1 to 4 were reacted under prescribed conditions (temperature: about 1220° C., time: 10 minutes). The reaction layers of the cladding materials obtained by the aforementioned reaction were regarded as portions bonded by brazing/bonding according to the aforementioned first embodiment, sections of the reaction layers were filled up with resin, and thereafter polished. The contents (mass %) of Ni, Cr and Ti in the sections of the reaction layers were analyzed by EPMA (electron probe microanalysis). Further, composition (mass %) ratios between Ti and Ni in the reaction layers of the cladding materials obtained by the experiment were analyzed. The following Tables 4 to 6 show the results thereof.

TABLE 4

|  | Composition (mass %) Ratio of Reaction Layer | | | Composition (mass %) Ratio Between Ti and Ni in Reaction Layer | |
| --- | --- | --- | --- | --- | --- |
|  | Ti | Cr | Ni | Ti | Ni |
| Example 1 | 26.7 | 25.0 | 48.3 | 35.6 | 64.4 |
| Example 2 | 31.0 | 24.3 | 44.7 | 40.9 | 59.1 |
| Example 3 | 21.4 | 29.1 | 49.5 | 30.2 | 69.8 |
| Example 4 | 32.0 | 20.0 | 48.0 | 40.0 | 60.0 |
| Example 5 | 22.6 | 26.0 | 51.4 | 30.6 | 69.4 |

TABLE 5

|  | Composition (mass %) Ratio of Reaction Layer | | | Composition (mass %) Ratio Between Ti and Ni in Reaction Layer | |
| --- | --- | --- | --- | --- | --- |
|  | Ti | Cr | Ni | Ti | Ni |
| Example 6 | 31.3 | 11.2 | 57.5 | 35.3 | 64.7 |
| Example 7 | 35.2 | 11.0 | 53.8 | 39.6 | 60.4 |
| Example 8 | 26.5 | 13.3 | 60.2 | 30.5 | 69.5 |
| Example 9 | 27.0 | 11.7 | 61.3 | 30.5 | 69.5 |

TABLE 6

|  | Composition (mass %) Ratio of Reaction Layer | | | Composition (mass %) Ratio Between Ti and Ni in Reaction Layer | |
| --- | --- | --- | --- | --- | --- |
|  | Ti | Cr | Ni | Ti | Ni |
| Comparative Example 1 | 35.9 | 8.8 | 55.3 | 39.4 | 60.6 |
| Comparative Example 2 | not melted | | | — | — |
| Comparative Example 3 | Cr—Ni alloy remained | | | — | — |
| Comparative Example 4 | TiNi intermetallic compound precipitated | | | 44.6 | 55.4 |

Referring to Table 4, the composition (mass %) ratios of the reaction layer obtained by reacting the brazing filler metal according to Example 1 were 26.7 mass % of Ti, 25.0 mass % of Cr and 48.3 mass % of Ni. Further, the composition ratio between Ti and Ni in the reaction layer according to Example 1 was 35.6 mass %:64.4 mass %, reaching the eutectic composition e2 (see FIG. 4). The composition (mass %) ratios of the reaction layer obtained by reacting the brazing filler metal according to Example 2 were 31.0 mass % of Ti, 24.3 mass % of Cr and 44.7 mass % of Ni. Further, the composition ratio between Ti and Ni in the reaction layer according to Example 2 was 40.9 mass %:59.1 mass %, substantially reaching the composition be2 (see FIG. 4). The composition (mass %) ratios of the reaction layer obtained by reacting the brazing filler metal according to Example 3 were 21.4 mass % of Ti, 29.1 mass % of Cr and 49.5 mass % of Ni. Further, the composition ratio between Ti and Ni in the reaction layer according to Example 3 was 30.2 mass %:69.8 mass %, substantially reaching the composition ae2 (see FIG. 4). The composition (mass %) ratios of the reaction layer obtained by reacting the brazing filler metal according to Example 4 were 32.0 mass % of Ti, 20.0 mass % of Cr and 48.0 mass % of Ni. Further, the composition ratio between Ti and Ni in the reaction layer according to Example 4 was 40.0 mass %:60.0 mass %, substantially reaching the composition be2 (see FIG. 4). The composition (mass %) ratios of the reaction layer obtained by reacting the brazing filler metal according to Example 5 were 22.6 mass % of Ti, 26.0 mass % of Cr and 51.4 mass % of Ni. Further, the composition ratio between Ti and Ni in the reaction layer according to Example 5 was 30.6 mass %:69.4 mass %, substantially reaching the composition ae2 (see FIG. 4).

Referring to the above Table 5, the composition (mass %) ratios of the reaction layer obtained by reacting the brazing filler metal according to Example 6 were 31.3 mass % of Ti, 11.2 mass % of Cr and 57.5 mass % of Ni. Further, the composition ratio between Ti and Ni in the reaction layer according to Example 6 was 35.3 mass %:64.7 mass %, substantially reaching the eutectic composition e2 (see FIG. 4). The composition (mass %) ratios of the reaction layer obtained by reacting the brazing filler metal according to Example 7 were 35.2 mass % of Ti, 11.0 mass % of Cr and 53.8 mass % of Ni. Further, the composition ratio between Ti and Ni in the reaction layer according to Example 7 was 39.6 mass %:60.4 mass %, substantially reaching the composition be2 (see FIG. 4). The composition (mass %) ratios of the reaction layer obtained by reacting the brazing filler metal according to Example 8 were 26.5 mass % of Ti, 13.3 mass % of Cr and 60.2 mass % of Ni. Further, the composition ratio between Ti and Ni in the reaction layer according to Example 8 was 30.5 mass %:69.5 mass %, substantially reaching the composition ae2 (see FIG. 4). The composition (mass %) ratios of the reaction layer obtained by reacting the brazing filler metal according to Example 9 were 27.0 mass % of Ti, 11.7 mass % of Cr and 61.3 mass % of Ni. Further, the composition ratio between Ti and Ni in the reaction layer according to Example 9 was 30.5 mass %:69.5 mass %, substantially reaching the composition ae2 (see FIG. 4). Thus, it has been proved from the compositions of the reaction layers obtained by reacting the brazing filler metals according to Examples 1 to 9 that the reaction layers consist of Ti—Ni—Cr alloys.

Referring to the above Table 6, the composition (mass %) ratios of the reaction layer obtained by reacting the brazing filler metal according to comparative example 1 were 35.9 mass % of Ti, 8.8 mass % of Cr and 55.3 mass % of Ni. Thus, it has been proved from the composition of the reaction layer obtained by reacting the brazing filler metal according to comparative example 1 that the reaction consists of a Ti—Ni—Cr alloy containing 8.8 mass % of Cr. The composition ratio between Ti and Ni in the reaction layer according to comparative example 1 was 39.4 mass %:60.6 mass %, substantially reaching the composition be2 (see FIG. 4). It has been proved that the reaction layer obtained by reacting the brazing filler metal according to comparative example 2 does not melt at a temperature of not more than about 1220° C. (see FIG. 4). Further, it has been proved that the Ni—Cr alloy layer remains in the reaction layer obtained by reacting the brazing filler metal according to comparative example 3 at a temperature of not more than about 1220° C. (see FIG. 4). In addition, it has been proved that an intermetallic compound consisting of $Ti_2Ni$ was precipitated in the reaction layer obtained by reacting the brazing filler metal according to comparative example 4.

[Oxidation Resistance Evaluation Test]
(Common to Examples 1 to 9 and Comparative Examples 1 to 4)

An oxidation test for evaluating oxidation resistance of the reaction layers (portions bonded by brazing/bonding) obtained by reacting the brazing filler metals according to the aforementioned Examples 1 to 9 and comparative example 1 was conducted. More specifically, the reaction layers obtained by reacting the brazing filler metals according to Examples 1 to 9 and comparative example 1 were cut into 50 mm by 50 mm square for measuring the weights of the reaction layers before the oxidation test, and thereafter heated in the atmosphere at a temperature of 700° C. for 100 hours. The weights of the reaction layers after the oxidation test were measured for calculating the oxidative weight increases of the reaction layers from changes of the weights of the reaction layers before and after the oxidation test while evaluating oxidation resistance of the reaction layers. The oxidation test conducted on the reaction layers obtained by reacting the brazing filler metals according to Examples 1 to 9 and comparative example 1 was conducted also on SUS316L and SUS304 as comparative examples 5 and 6. In other words, SUS316L according to comparative example 5 and SUS304 according to comparative example 6 were cut into 50 mm by 50 mm square for measuring the weights before the oxidation test, and thereafter heated in the atmosphere at a temperature of 700° C. for 100 hours. The weights after the oxidation test were measured for calculating the oxidative weight increases from changes of the weights before and after the oxidation test. Table 7 shows the results of the above. As to comparative examples 2 to 4, no oxidation test was conducted since the reaction layers did not homogeneously mix.

TABLE 7

| | Oxidation Resistance Oxidative Weight Increase (mg/cm$^2$) |
|---|---|
| Example 1 | 0.042 |
| Example 2 | 0.050 |
| Example 3 | 0.031 |
| Example 4 | 0.063 |
| Example 5 | 0.049 |
| Example 6 | 0.213 |
| Example 7 | 0.228 |
| Example 8 | 0.201 |
| Example 9 | 0.211 |
| Comparative Example 1 | 0.451 |
| Comparative Example 2 | — |
| Comparative Example 3 | — |
| Comparative Example 4 | — |
| Comparative Example 5 (SUS316L) | 0.139 |
| Comparative Example 6 (SUS304) | 0.230 |

Referring to the Above Table 7, the Oxidative Weight increase of the reaction layer containing Ti in the ratio of 26.7 mass %, Cr in the ratio of 25.0 mass % and Ni in the ratio of 48.3 mass % obtained by reacting the brazing filler metal according to Example 1 before and after the oxidation test was 0.042 mg/cm$^2$. The oxidative weight increase of the reaction layer containing Ti in the ratio of 21.4 mass %, Cr in the ratio of 29.1 mass % and Ni in the ratio of 49.5 mass % obtained by reacting the brazing filler metal according to Example 2 before and after the oxidation test was 0.050 mg/cm$^2$. The oxidative weight increase of the reaction layer containing Ti in the ratio of 21.4 mass %, Cr in the ratio of 29.1 mass % and Ni in the ratio of 49.5 mass % obtained by reacting the brazing filler metal according to Example 3 before and after the oxidation test was 0.031 mg/cm$^2$. The oxidative weight increase of the reaction layer containing Ti in the ratio of 32.0 mass %, Cr in the ratio of 20.0 mass % and Ni in the ratio of 48.0 mass % obtained by reacting the brazing filler metal according to Example 4 before and after the oxidation test was 0.063 mg/cm$^2$. The oxidative weight increase of the reaction layer containing Ti in the ratio of 22.6 mass %, Cr in the ratio of 26.0 mass % and Ni in the ratio of 51.4 mass % obtained by reacting the brazing filler metal according to Example 5 before and after the oxidation test was 0.049 mg/cm$^2$.

The oxidative weight increase of the reaction layer containing Ti in the ratio of 31.3 mass %, Cr in the ratio of 11.2 mass % and Ni in the ratio of 57.5 mass % obtained by reacting the brazing filler metal according to Example 6 before and after the oxidation test was 0.213 mg/cm$^2$. The oxidative weight increase of the reaction layer containing T in the ratio of 35.2 mass %, Cr in the ratio of 11.0 mass % and Ni in the ratio of 53.8 mass % obtained by reacting the brazing filler metal according to Example 7 before and after the oxidation test was 0.228 mg/cm$^2$. The oxidative weight increase of the reaction layer containing Ti in the ratio of 26.5 mass %, Cr in the ratio of 13.3 mass % and Ti in the ratio of 60.2 mass % obtained by reacting the brazing filler metal according to Example 8 before and after the oxidation test was 0.201 mg/cm$^2$. The oxidative weight increase of the reaction layer containing Ti in the ratio of 27.0 mass %, Cr in the ratio of 11.7 mass % and Ni in the ratio of 61.3 mass % obtained by reacting the brazing filler metal according to Example 9 before and after the oxidation test was 0.211 mg/cm$^2$.

The oxidative weight increase of the reaction layer containing Ti in the ratio of 35.9 mass %, Cr in the ratio of 8.8 mass % and Ni in the ratio of 55.3 mass % obtained by reacting the brazing filler metal according to comparative example 1 before and after the oxidation test was 0.451 mg/cm$^2$. The oxidative weight increase of SUS316L according to comparative example 5 before and after the oxidation test was 0.139 mg/cm$^2$. The oxidative weight increase of SUS304 according to comparative example 6 before and after the oxidation test was 0.230 mg/cm$^2$.

Comparing the oxidative weight increases of the reaction layers obtained by reacting the brazing filler metals according to Examples 1 to 9 and comparative example 1 with each other, it has been proved from the aforementioned results that the oxidative weight increases (0.042 mg/cm$^2$, 0.050 mg/cm$^2$, 0.031 mg/cm$^2$, 0.063 mg/cm$^2$, 0.049 mg/cm$^2$, 0.213 mg/cm$^2$, 0.228 mg/cm$^2$, 0.201 mg/cm$^2$ and 0.211 mg/cm$^2$) of the reaction layers obtained by reacting the brazing filler metals according to Examples 1 to 9 are smaller than the oxidative weight increase (0.451 mg/cm$^2$) of the reaction layer obtained by reacting the brazing filler metal according to comparative example 1, to exhibit high oxidation resistance. This is conceivably because the reaction layer obtained by reacting the brazing filler metal according to comparative example 1 contained only 8.8 mass % of Cr while the reaction layers obtained by reacting the brazing filler metals according to Examples 1 to 9 contained at least 11.0 mass % of Cr and hence oxide films of Cr$_2$O$_3$ were sufficiently formed on the surfaces of the reaction layers obtained by reacting the brazing filler metals according to Examples 1 to 9.

Comparing the oxidative weight increases of the reaction layers obtained by reacting the brazing filler metals according to Examples 1 to 9 and SUS316L and SUS304 according to comparative examples 5 and 6 with each other, it has been proved that the oxidative weight increases (0.042 mg/cm$^2$, 0.050 mg/cm$^2$, 0.031 mg/cm$^2$, 0.063 mg/cm$^2$ and 0.049 mg/cm$^2$) of the reaction layers obtained by reacting the brazing filler metals according to Examples 1 to 5 including the 40% Cr—Ni alloy layers were smaller than the oxidative weight increases (0.319 mg/cm$^2$ and 0.230 mg/cm$^2$) of SUS316L and SUS304 according to comparative examples 5 and 6. Thus, bonded portions brazed/bonded with the brazing filler metals according to Examples 1 to 5 including the 40% Cr—Ni alloy layers are conceivably not oxidized earlier than stainless steel since the same have higher oxidation resistance than stainless steel such as SUS316L and SUS304. Consequently, the brazing filler metals according to Examples 1 to 5 including the 40% Cr—Ni alloy layers are conceivably more preferable as brazing filler metals for stainless steel or the like. On the other hand, it has been proved that the oxidative weight increases (0.213 mg/cm$^2$, 0.228 mg/cm$^2$, 0.201 mg/cm$^2$ and 0.211 mg/cm$^2$) of the reaction layers obtained by reacting the brazing filler metals according to Examples 6 to 9 including the 20% Cr—Ni alloy layers were larger than the oxidative weight increase (0.139 mg/cm$^2$) of SUS316L according to comparative example 5. This is conceivably because the contents of Cr in the Cr—Ni alloy layers were so small as compared with Examples 1 to 5 that the contents of Cr in the reaction layers also decreased in Examples 6 to 9. In other words, Examples 6 to 9 were conceivably reduced in oxidation resistance since the reaction layers after brazing contained only 11.0 to 13.3 mass % of Cr while the reaction layers after brazing contained at least 20 mass % of Cr in Examples 1 to 5, as shown in Tables 4 and 5. Thus, bonded portions brazed/bonded with the brazing filler metals according to Examples 6 to 9 including the 20% Cr—Ni alloy layers are conceivably oxidized earlier than stainless steel SUS316L, since the same have lower oxidation resistance than SUS316L. Consequently, it has been proved that the brazing filler metals according to Examples 6 to 9 are not very suitable as brazing filler metals for stainless steel SUS316L.

On the other hand, it has been proved that all of the oxidative weight increases of the reaction layers obtained by reacting the brazing filler metals according to Examples 1 to 9 are smaller than the oxidative weight increase of SUS304 according to comparative example 6. Thus, bonded portions brazed/bonded with the brazing filler metals according to Examples 1 to 9, having higher oxidation resistance than SUS304, conceivably have higher oxidation resistance than stainless steel SUS304. Consequently, the brazing filler metals according to Examples 1 to 9 are conceivably preferable as brazing filler metals for stainless steel SUS304.

Third Embodiment

Figure 13:
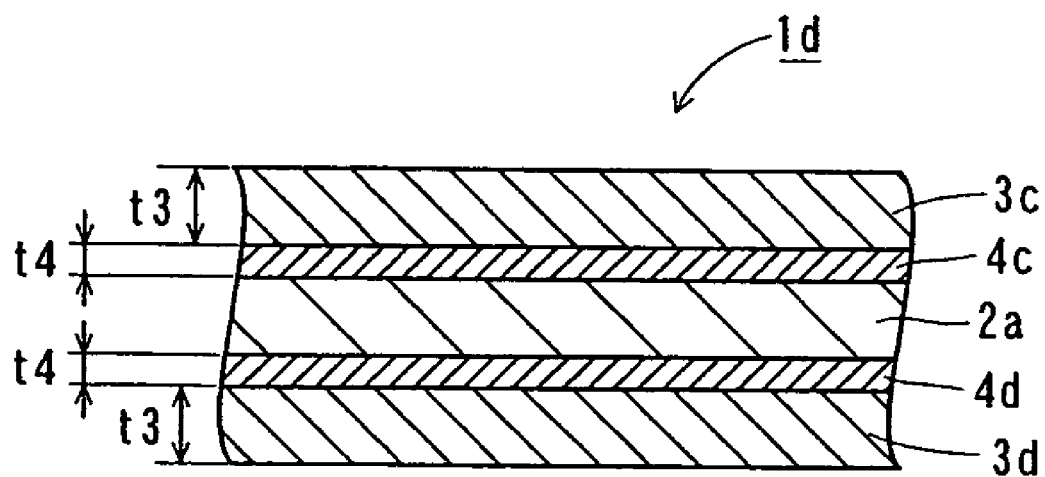
FIG. 13 A sectional view showing the structure of a brazing filler metal according to a third embodiment of the present invention.

Referring to FIG. 13, a case of adding Mo or Co to a brazing filler metal 1$d$ is described in this third embodiment, dissimilarly to the aforementioned first embodiment.

The brazing filler metal 1$d$ according to the third embodiment has an Ni—Cr alloy layer 2$a$, a Ti layer 3$c$ arranged on the side of a first surface of the Ni—Cr alloy layer 2$a$, another Ti layer 3$d$ arranged on the side of a second surface of the Ni—Cr alloy layer 2$a$, an Ni layer 4$c$ arranged between the Ni—Cr alloy layer 2$a$ and the Ti layer 3$c$ and another Ni layer 4$d$ arranged between the Ni—Cr alloy layer 2$a$ and the Ti layer 3$d$, as shown in FIG. 13.

According to the third embodiment, Mo or Co is added to at least any one of the Ni—Cr alloy layer 2$a$, the Ti layers 3$c$ and 3$d$ and the Ni layers 4$c$ and 4$d$.

According to the third embodiment, Mo or Co is so contained that the content with respect to the brazing filler metal 1$d$ is not more than about 10 mass %. A content of about 2.0 mass % to about 4.5 mass % is preferable when Mo is contained in Ti—Ni—Cr alloys 1$e$, while a content of about 2.0 mass % to about 10 mass % is preferable when Co is contained in the Ti—Ni—Cr alloys 1$e$. The Ni layers 4$c$ and 4$d$ are rolled/bonded to the Ni—Cr alloy layer 2$a$. The Ti layers 3$c$ and 3$d$ are rolled/bonded to the Ni layers 4$c$ and 4$d$ rolled/bonded to the Ni—Cr alloy layer 2$a$. Hot welding, cold welding or vacuum welding can be employed as rolling/bonding, for example. The Ni—Cr alloy layer 2a is an example of the "Ni—Cr brazing layer" in the present invention. The Ti layer 3c is an example of the "Ti brazing layer" and the "first Ti brazing layer" in the present invention, and the Ti layer 3d is an example of the "Ti brazing layer" and the "second Ti brazing layer" in the present invention. The Ni layer 4c is an example of the "Ni brazing layer" and the "first Ni brazing layer" in the present invention, and the Ni layer 4d is an example of the "Ni brazing layer" and the "second Ni brazing layer" in the present invention.

The Ni—Cr alloy layer 2a is constituted of Ni and Cr. According to the third embodiment, Mo or Co may be added to the Ni—Cr alloy layer 2a. The content of Cr in the Ni—Cr alloy layer 2a is at least about 20 mass % and not more than about 40 mass %. The Ti layers 3c and 3d are constituted of Ti. According to the third embodiment, Mo or Co may be added to the Ti layers 3c and 3d. The Ti layers 3c and 3d have a thickness t3 respectively. The Ni layers 4c and 4d are constituted of Ni. According to the third embodiment, Mo or Co may be added to the Ni layers 4c and 4d. The Ni layers 4c and 4d have a thickness t4 respectively.

According to the third embodiment, the Ni content in the Ni layer 4c is at least 21.5 mass % and not more than 37.5 mass %, preferably about 28.3 mass % forming a eutectic composition of a Ti—Ni alloy in an initial stage of brazing, assuming that the sum of the Ti content in the Ti layer 3c and the Ni content in the Ni layer 4c is 100 mass %. Further, the Ni content in the Ni layer 4d is at least 21.5 mass % and not more than 37.5 mass %, preferably about 28.3 mass % forming the eutectic composition of the Ti—Ni alloy in the initial stage of brazing, assuming that the sum of the Ti content in the Ti layer 3d and the Ni content in the Ni layer 4d is 100 mass %. The ratio t4/t3 between the thickness t3 of the Ti layers 3c and 3d and the thickness t4 of the Ni layers 4c and 4d is at least ⅛ and not more than ⅔, preferably about ⅕.

The structure of a heat exchanger 100a formed with the brazing filler metal 1d according to the third embodiment is now described with reference to FIGS. 13 and 14.

Figure 14:
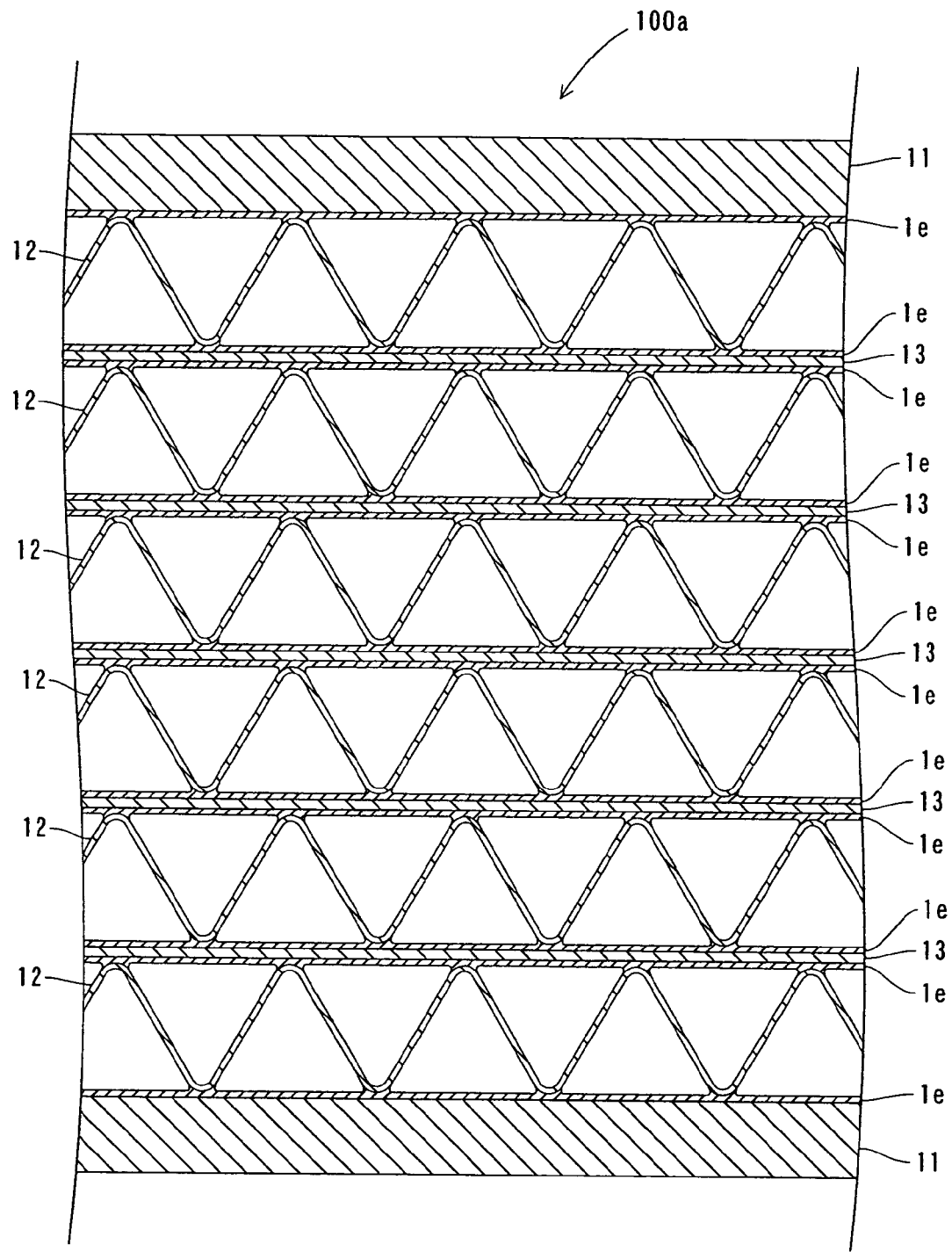
FIG. 14 A sectional view partially showing a heat exchanger formed with the brazing filler metal according to the third embodiment shown in FIG. 13.

The heat exchanger 10a formed with the brazing filler metal 1d (see FIG. 13) according to the third embodiment includes the Ti—Ni—Cr alloys 1e formed by brazing/bonding between fins 12 and plates 13 and 11, as shown in FIG. 14.

The remaining structure of the heat exchanger 100a formed with the brazing filler metal 1d according to the third embodiment is similar to that of the heat exchanger 100 formed with the brazing filler metal 1 according to the aforementioned first embodiment.

Brazing/bonding performed with the brazing filler metal 1d according to the third embodiment of the present invention is described with reference to FIGS. 13 and 14.

First, the brazing filler metal 1d (see FIG. 13) is arranged between the plates 11 and the fins 12, while the brazing filler metal 1d is arranged between the fins 12 and the plates 13, as shown in FIG. 14. According to the third embodiment, heating is performed in inert gas or in a vacuum at a temperature of at least about 1110° C. and not more than about 1150° C. for about 10 minutes, dissimilarly to the aforementioned first embodiment. The remaining process of brazing/bonding with the brazing filler metal 1d according to the third embodiment is similar to the process of brazing/bonding with the brazing filler metal 1 according to the aforementioned first embodiment.

According to the third embodiment, as hereinabove described, Mo or Co is so added to the brazing filler metal 1d that Cr and Mo or Co form an alloy on portions bonded by brazing/bonding in brazing to be capable of increasing Cr concentrations on the surfaces of the bonded portions and more sufficiently forming oxide films of $Cr_2O_3$ on the surfaces of the bonded portions, whereby oxidation resistance of the portions bonded by brazing/bonding can be more improved. Further, Mo or Co is so added to the brazing filler metal 1d that the melting point of the brazing filler metal 1d can be reduced below about 1150° C. In this case, brazing can be performed at a temperature of not more than about 1150° C., whereby crystals of the plates 11 and 13 and the fins 12 consisting of SUS304, SUS316 or the like can be inhibited from becoming course due to heat in brazing. Thus, strength of the plates 11 and 13 and the fins 12 can be so improved that the thicknesses of the plates 11 and 13 and the fins 12 can be reduced. Consequently, the heat exchanger 100a can be rendered lightweight, while effectiveness of the heat exchanger 100a can be improved by rendering heat of exhaust gas flowing through the heat exchanger 100a easily transmittable to water.

The remaining effect of the third embodiment is similar to that of the aforementioned first embodiment.

Fourth Embodiment

Figure 15:
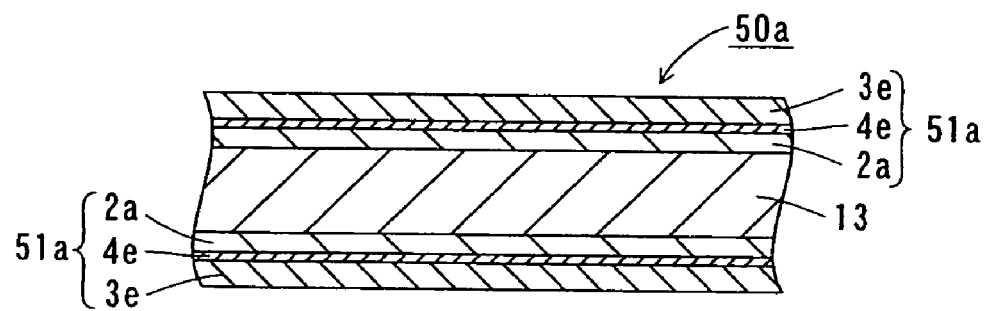
FIG. 15 A sectional view showing the structure of a brazing composite material according to a fourth embodiment of the present invention.

Referring to FIGS. 14 and 15, such a brazing composite material 50a that brazing filler metals 51a consisting of three-layer structures are rolled/bonded to a substrate 13 is described in this fourth embodiment, dissimilarly to the aforementioned third embodiment.

The brazing composite material 50a according to the fourth embodiment of the present invention comprises a plate 13 made of stainless steel and a pair of brazing filler metals 51a rolled/bonded to first and second surfaces of the plate 13, as shown in FIG. 15.

According to the fourth embodiment, the pair of brazing filler metals 51 are constituted of three-layer structures of Ni—Cr alloy layers 2a rolled/bonded to the plate 13, Ti layers 3e and Ni layers 4e arranged between the Ni—Cr alloy layers 2a and the Ti layers 3e respectively. Assuming that the sum of the Ti content in the Ti layers 3e and the Ni content in the Ni layers 4e is 100 mass %, the Ni content in the Ni layers 4e is at least 21.5 mass % and not more than 37.5 mass %, and preferably about 28.3 mass % forming a eutectic composition of a Ti—Ni alloy in an initial stage of brazing. According to the fourth embodiment, Mo or Co is added to at least any one(s) of the Ni—Cr alloy layers 2a, the Ti layers 3e and the Ni layers 4e. According to the fourth embodiment, further, Mo or Co is so contained that the content with respect to the brazing filler metals 51a is not more than about 10 mass %. A content of about 2.0 mass t to about 4.5 mass % is preferable when Mo is contained in the brazing filler metals 51a, while a content of about 2.0 mass % to about 10 mass % is preferable when Co is contained in the brazing filler metals 51a.

In order to form the heat exchanger 100a with the brazing filler metals 51a according to the fourth embodiment, the brazing composite material 50a (see FIG. 15) is arranged to be in contact with bent portions of fins 12, as shown in FIG. 14. Brazing/bonding is performed under conditions (performing heating in inert gas or in a vacuum at a temperature of at least about 1110° C. and not more than about 1150° C. for about 10 minutes) similar to those for the brazing/bonding performed in the aforementioned third embodiment.

The structure of the brazing composite material 50a according to the aforementioned fourth embodiment and the remaining process of brazing/bonding employing the same are similar to those of the aforementioned second and third embodiments.

The effect of the fourth embodiment is similar to that of the aforementioned third embodiment.

EXAMPLES 1 AND 10 TO 15

A comparative experiment conducted for confirming the effect (effect of improving oxidation resistance of portions bonded by brazing/bonding) of the aforementioned third embodiment of the present invention is now described. In this comparative experiment, compositions of the reaction layer (portion bonded by brazing/bonding) of the cladding material according to Example 1 corresponding to the aforementioned first embodiment formed with the brazing filler metal containing neither Mo nor Co and reaction layers (portions bonded by brazing/bonding) of cladding materials according to Examples 10 to 15 formed with brazing filler metals containing either Mo or Co were compared with each other. Further, oxidation resistance of the reaction layers (portions bonded by brazing/bonding) of the cladding materials according to Examples 1 and 10 to 15 was evaluated by calculating oxidative weight increases of the reaction layers (portions bonded by brazing/bonding) of the cladding materials according to Examples 1 and 10 to 15 and comparing the same with each other. This is now described in detail.

[Preparation of Brazing Filler Metal]

Example 1

The brazing filler metal according to Example 1 was prepared similarly to the comparative experiment conducted for confirming the effect of the aforementioned first embodiment.

Example 10

An Ni—Cr alloy layer containing 60 mass % of Ni and 40 mass % of Cr, Ni layers to which 5 mass % of Mo was added and pure Ti layers were employed as raw materials for the brazing filler metal. The Ni layers were rolled/bonded to first and second surfaces of the Ni—Cr alloy layer respectively, and diffusion annealing was thereafter performed under an argon atmosphere at a temperature of 800° C. for one minute. The thicknesses of the Ni—Cr alloy layer and the Ni layers were adjusted to 24.2 μm and 1.9 μm respectively by performing finish rolling and annealing. Further, the pure Ti layers were rolled/bonded to the Ni layers rolled/bonded to both surfaces of the Ni—Cr alloy layer respectively, and diffusion annealing was thereafter performed under an argon atmosphere at a temperature of 800° C. for one minute. The thicknesses of the pure Ti layers were adjusted to 11.0 μm respectively by performing finish rolling and annealing, thereby preparing the brazing filler metal according to Example 10 having a five-layer structure of pure Ti layer/Ni layer/Ni—Cr alloy layer/Ni layer/pure Ni layer. Thus, the content (mass %) of Ni in the Ni layers with respect to the sum of Ti in the pure Ti layers and Ni in the Ni layers before brazing was made to reach 24.5 mass %.

Example 11

An Ni—Cr alloy layer containing 60 mass % of Ni and 40 mass % of Cr, Ni layers to which 10 mass % of Mo was added and pure Ti layers were employed as raw materials for the brazing filler metal. The brazing filler metal according to Example 11 having a five-layer structure of pure Ti layer/Ni layer/Ni—Cr alloy layer/Ni layer/pure Ni layer was prepared similarly to the aforementioned Example 1, except that the thicknesses of the Ni—Cr alloy layer, the Ni layers and the pure Ti layers were adjusted to 23.6 μm, 2.0 μm and 11.2 μm respectively by performing finish rolling and annealing. Thus, the content (mass %) of Ni in the Ni layers with respect to the sum of Ti in the pure Ti layers and Ni in the Ni layers before brazing was made to reach 24.1 mass %.

Example 12

An Ni—Cr alloy layer containing 60 mass % of Ni and 40 mass % of Cr, Ni layers to which 20 mass % of Mo was added and pure Ti layers were employed as raw materials for the brazing filler metal. The brazing filler metal according to Example 12 having a five-layer structure of pure Ti layer/Ni layer/Ni—Cr alloy layer/Ni layer/pure Ni layer was prepared similarly to the aforementioned Example 1, except that the thicknesses of the Ni—Cr alloy layer, the Ni layers and the pure Ti layers were adjusted to 24.2 μm, 2.0 μm and 10.9 μm respectively by performing finish rolling and annealing. Thus, the content (mass %) of Ni in the Ni layers with respect to the sum of Ti in the pure Ti layers and Ni in the Ni layers before brazing was made to reach 22.5 mass %.

Example 13

An Ni—Cr alloy layer containing 60 mass % of Ni and 40 mass % of Cr, Ni layers to which 35 mass % of Mo was added and pure Ti layers were employed as raw materials for the brazing filler metal. The brazing filler metal according to Example 13 having a five-layer structure of pure Ti layer/Ni layer/Ni—Cr alloy layer/Ni layer/pure Ni layer was prepared similarly to the aforementioned Example 1, except that the thicknesses of the Ni—Cr alloy layer, the Ni layers and the pure Ti layers were adjusted to 24.4 μm, 2.4 μm and 10.4 μm respectively by performing finish rolling and annealing. Thus, the content (mass %) of Ni in the Ni layers with respect to the sum of Ti in the pure Ti layers and Ni in the Ni layers before brazing was made to reach 22.9 mass %.

Example 14

An Ni—Cr alloy layer containing 60 mass % of Ni and 40 mass % of Cr with addition of 5 mass % of Mo, Ni layers to which 35 mass % of Mo was added and pure Ti layers were employed as raw materials for the brazing filler metal. The brazing filler metal according to Example 14 having a five-layer structure of pure Ti layer/Ni layer/Ni—Cr alloy layer/Ni layer/pure Ni layer was prepared similarly to the aforementioned Example 1, except that the thicknesses of the Ni—Cr alloy layer, the Ni layers and the pure Ti layers were adjusted to 24.8 μm, 2.5 μm and 10.1 μm respectively by performing finish rolling and annealing. Thus, the content (mass %) of Ni in the Ni layers with respect to the sum of Ti in the pure Ti layers and Ni in the Ni layers before brazing was made to reach 24.1 mass %.

Example 15

An Ni—Cr alloy layer containing 60 mass % of Ni and 40 mass % of Cr, Ni layers to which 12 mass % of Co was added and pure Ti layers were employed as raw materials for the brazing filler metal. The brazing filler metal according to Example 15 having a five-layer structure of pure Ti layer/Ni layer/Ni—Cr alloy layer/Ni layer/pure Ni layer was prepared similarly to the aforementioned Example 1, except that the thicknesses of the Ni—Cr alloy layer, the Ni layers and the pure Ti layers were adjusted to 23.6 μm, 2.1 μm and 11.1 μm respectively by performing finish rolling and annealing. Thus, the content (mass %) of Ni in the Ni layers with respect to the sum of Ti in the pure Ti layers and Ni in the Ni layers before brazing was made to reach 24.8 mass %.

Since a brazing filler metal is cracked in rolling when employing an Ni—Cr alloy layer containing 60 mass % of Ni and 40 mass % of Cr, Ni layers to which at least 40 mass % of Mo is added and pure Ti layers as raw materials for the brazing filler metal, the experiment was conducted by limiting the quantities of Mo added to the Ni layers to 35 mass % in this experiment.

The following Table 8 shows the correspondent relations between the thicknesses (μm) of the respective layers of the aforementioned brazing filler metals and the composition (mass %) ratios between the pure Ti layers and the pure Ni layers calculated on the basis of the thicknesses of the respective layers of the brazing filler metals.

TABLE 8

|  | Quantity of Mo (Co) added to Ni Alloy Layer (mass %) | Quantity of Mo added to Cr—Ni Alloy Layer (mass %) | Thickness of Layer (μm) | | | | | Ratio between Ti Layer and Ni Layer (mass %) | |
|---|---|---|---|---|---|---|---|---|---|
|  |  |  | Ti Layer | Ni Layer | 40% Cr—Ni Alloy Layer | Ni Layer | Ti Layer | Ti Layer | Ni Layer |
| Example 1 | 0 | 0 | 10.4 | 2.1 | 25.0 | 2.1 | 10.4 | 71.7 | 28.3 |
| Example 10 | 5 (Mo) | 0 | 11.0 | 1.9 | 24.2 | 1.9 | 11.0 | 75.5 | 24.5 |
| Example 11 | 10 (Mo) | 0 | 11.2 | 2.0 | 23.6 | 2.0 | 11.2 | 75.9 | 24.1 |
| Example 12 | 20 (Mo) | 0 | 10.9 | 2.0 | 24.2 | 2.0 | 10.9 | 77.5 | 22.5 |
| Example 13 | 35 (Mo) | 0 | 10.4 | 2.4 | 24.4 | 2.4 | 10.4 | 77.1 | 22.9 |
| Example 14 | 35 (Mo) | 5 (Mo) | 10.1 | 2.5 | 24.8 | 2.5 | 10.1 | 75.9 | 24.1 |
| Example 15 | 12 (Co) | 0 | 11.1 | 2.1 | 23.6 | 2.1 | 11.1 | 75.2 | 24.8 |

[Composition Analysis of Reaction Layer of Cladding Material]

(Common to Examples 1 and 10 to 15)

Then, the compositions of cladding materials obtained by reacting the brazing filler metals according to Examples 1 and 10 to 15 prepared in the aforementioned manner were analyzed. More specifically, the brazing filler metals according to Examples 1 and 10 to 15 were reacted under prescribed conditions (temperature: about 1150° C., time: 10 minutes). Reaction layers of the cladding materials obtained by the aforementioned reaction were regarded as portions bonded by brazing/bonding according to the aforementioned third embodiment, sections of the reaction layers were filled up with resin, and thereafter polished. The contents (mass %) of Ti, Cr, Ni, Mo and Co in the sections of the reaction layers were analyzed by EPMA. Further, composition (mass %) ratios between Ti and Ni in the reaction layers of the cladding materials obtained by the experiment were analyzed. The following Table 9 shows the results thereof.

TABLE 9

|  | Composition (mass %) Ratio of Reaction Layer | | | | | Composition (mass %) Ratio Between Ti and Ni in Reaction Layer | |
|---|---|---|---|---|---|---|---|
|  | Ti | Cr | Ni | Mo | Co | Ti | Ni |
| Example 1 | 26.7 | 25.0 | 48.3 | 0 | 0 | 35.6 | 64.4 |
| Example 10 | 28.6 | 24.6 | 46.2 | 0.5 | 0 | 38.2 | 61.8 |
| Example 11 | 29.3 | 24.1 | 45.5 | 1.0 | 0 | 39.2 | 60.8 |
| Example 12 | 28.3 | 24.6 | 45.1 | 2.1 | 0 | 38.6 | 61.4 |
| Example 13 | 26.7 | 24.5 | 44.6 | 4.3 | 0 | 37.4 | 62.6 |
| Example 14 | 25.7 | 24.7 | 42.1 | 7.5 | 0 | 37.9 | 62.1 |
| Example 15 | 29.0 | 24.1 | 45.7 | 0 | 1.3 | 38.8 | 61.2 |

Referring to Table 9, the composition (mass %) ratios of the reaction layer obtained by reacting the brazing filler metal according to Example 1 were 26.7 mass % of Ti, 25.0 mass % of Cr, 48.3 mass % of Ni and 0 mass % of Mo and Co. Further, the composition ratio between Ti and Ni in the reaction layer according to Example 1 was 35.6 mass %:64.4 mass %, reaching the eutectic composition e2 (see FIG. 4). The composition (mass %) ratios of the reaction layer obtained by reacting the brazing filler metal according to Example 10 were 28.6 mass % of Ti, 24.6 mass % of Cr, 46.2 mass % of Ni, 0.5 mass % of Mo and 0 mass % of Co. Further, the composition ratio between Ti and Ni in the reaction layer according to Example 10 was 38.2 mass %:61.8 mass %. The composition (mass %) ratios of the reaction layer obtained by reacting the brazing filler metal according to Example 11 were 29.3 mass % of Ti, 24.1 mass % of Cr, 45.5 mass % of N1, 1.0 mass % of Mo and 0 mass % of Co. Further, the composition ratio between Ti and Ni in the reaction layer according to Example 11 was 39.2 mass %:60.8 mass %. The composition (mass %) ratios of the reaction layer obtained by reacting the brazing filler metal according to Example 12 were 28.3 mass % of Ti, 24.6 mass % of Cr, 45.1 mass % of N1, 2.1 mass % of Mo and 0 mass % of Co. Further, the composition ratio between Ti and Ni in the reaction layer according to Example 12 was 38.6 mass %:61.4 mass %. The composition (mass %) ratios of the reaction layer obtained by reacting the brazing filler metal according to Example 13 were 26.7 mass % of Ti, 24.5 mass % of Cr, 44.6 mass % of N1, 4.3 mass % of Mo and 0 mass % of Co. Further, the composition ratio between Ti and Ni in the reaction layer according to Example 13 was 37.4 mass %:62.6 mass %. The composition (mass %) ratios of the reaction layer obtained by reacting the brazing filler metal according to Example 14 were 25.7 mass % of Ti, 24.7 mass % of Cr, 42.1 mass % of N1, 7.5 mass % of Mo and 0 mass % of Co. Further, the composition ratio between Ti and Ni in the reaction layer according to Example 14 was 37.9 mass %:62.1 mass %. The composition (mass %) ratios of the reaction layer obtained by reacting the brazing filler metal according to Example 15 were 29.0 mass % of Ti, 24.1 mass % of Cr, 45.7 mass % of Ni, 0 mass % of Mo and 1.3 mass t of Co. Further, the composition ratio between Ti and Ni in the reaction layer according to Example 15 was 38.8 mass %:61.2 mass %. Thus, it has been proved from the compositions of the reaction layers obtained by reacting the brazing filler metals according to Examples 1 and 10 to 15 that the reaction layers consist of Ti—Ni—Cr alloys.

[Oxidation Resistance Evaluation Test]

(Common to Examples 1 and 10 to 15)

An oxidation test for evaluating oxidation resistance of the reaction layers (portions bonded by brazing/bonding)

obtained by reacting the brazing filler metals according to the aforementioned Examples 1 and 10 to 15 was conducted. More specifically, the reaction layers obtained by reacting the brazing filler metals according to Examples 1 and 10 to 15 were cut into 50 mm by 50 mm square for measuring the weights of the reaction layers before the oxidation test, and thereafter heated in the atmosphere at a temperature of 700° C. for 100 hours. The weights of the reaction layers after the oxidation test were measured for calculating the oxidative weight increases of the reaction layers from changes of the weights of the reaction layers before and after the oxidation test while evaluating oxidation resistance of the reaction layers. Table 10 shows the results.

TABLE 10

| | Oxidation Resistance Oxidative Weight Increase (mg/cm$^2$) |
|---|---|
| Example 1 | 0.042 |
| Example 10 | 0.026 |
| Example 11 | 0.015 |
| Example 12 | 0.004 |
| Example 13 | 0.003 |
| Example 14 | 0.002 |
| Example 15 | 0.022 |

Referring to the above Table 10, the oxidative weight increase of the reaction layer containing Ti in the ratio of 26.7 mass %, Cr in the ratio of 25.0 mass %, Ni in the ratio of 48.3 mass % and Mo and Co 0 mass % obtained by reacting the brazing filler metal according to Example 1 before and after the oxidation test was 0.042 mg/cm$^2$. The oxidative weight increase of the reaction layer containing Ti in the ratio of 28.6 mass %, Cr in the ratio of 24.6 mass %, Ni in the ratio of 46.2 mass %, Mo in the ratio of 0.5 mass % and Co in the ratio of 0 mass % obtained by reacting the brazing filler metal according to Example 10 before and after the oxidation test was 0.026 mg/cm$^2$. The oxidative weight increase of the reaction layer containing Ti in the ratio of 29.3 mass %, Cr in the ratio of 24.1 mass %, Ni in the ratio of 45.5 mass %, Mo in the ratio of 1.0 mass % and Co in the ratio of 0 mass % obtained by reacting the brazing filler metal according to Example 11 before and after the oxidation test was 0.015 mg/cm$^2$. The oxidative weight increase of the reaction layer containing Ti in the ratio of 28.3 mass %, Cr in the ratio of 24.6 mass %, Ni in the ratio of 45.1 mass %, Mo in the ratio of 2.1 mass % and Co in the ratio of 0 mass % obtained by reacting the brazing filler metal according to Example 12 before and after the oxidation test was 0.004 mg/cm$^2$. The oxidative weight increase of the reaction layer containing Ti in the ratio of 26.7 mass %, Cr in the ratio of 24.5 mass %, Ni in the ratio of 44.6 mass %, Mo in the ratio of 4.3 mass % and Co in the ratio of 0 mass % obtained by reacting the brazing filler metal according to Example 13 before and after the oxidation test was 0.003 mg/cm$^2$. The oxidative weight increase of the reaction layer containing Ti in the ratio of 25.7 mass %, Cr in the ratio of 24.7 mass %, Ni in the ratio of 42.1 mass %, Mo in the ratio of 7.5 mass % and Co in the ratio of 0 mass % obtained by reacting the brazing filler metal according to Example 14 before and after the oxidation test was 0.002 mg/cm$^2$. The oxidative weight increase of the reaction layer containing Ti in the ratio of 29.0 mass %, Cr in the ratio of 24.1 mass %, Ni in the ratio of 45.7 mass %, Mo in the ratio of 0 mass % and Co in the ratio of 1.3 mass % obtained by reacting the brazing filler metal according to Example 15 before and after the oxidation test was 0.022 mg/cm$^2$.

Comparing the oxidative weight increases of the reaction layers obtained by reacting the brazing filler metals according to Examples 1 and 10 to 15 with each other, it has been proved from the aforementioned results that the oxidative weight increases (0.026 mg/cm$^2$, 0.015 mg/cm$^2$, 0.004 mg/cm$^2$, 0.003 mg/cm$^2$, 0.002 mg/cm$^2$ and 0.022 mg/cm$^2$) of the reaction layers obtained by reacting the brazing filler metals according to Examples 10 to 15 are smaller than the oxidative weight increase (0.042 mg/cm$^2$) of the reaction layer obtained by reacting the brazing filler metal according to Example 1, to exhibit high oxidation resistance. This is conceivably because neither Mo nor Co was added to the reaction layer obtained by reacting the brazing filler metal according to Example 1 while at least 0.5 mass % of Mo and/or Co was added to the reaction layers obtained by reacting the brazing filler metals according to Examples 10 to 15 and hence Cr and Mo or Co so formed alloys that oxide films of $Cr_2O_3$ were more sufficiently formed on the surfaces of the reaction layers.

Comparing the oxidative weight increases of the reaction layers obtained by reacting the brazing filler metals according to Examples 10 to 14 with each other, it has been proved that the oxidative weight increases of the reaction layers decrease as the quantities of Mo added to the reaction layers are increased. In other words, it has been proved to be possible to improve oxidation resistance of the reaction layers as the quantities of Mo added to the reaction layers are increased.

Comparing the oxidative weight increases of the reaction layers obtained by reacting the brazing filler metals according to Examples 1 and 10 to 14 with each other, it has been proved that the oxidative weight increases are not more than about 1/10 when the quantities of Mo added to the reaction layers were at least about 2.0 mass % (Examples 12 to 14), as compared with a case of adding no Mo to the reaction layers. Further, it has been proved that the oxidative weight increase of the reaction layer effectively decreases when the quantity of Mo added to the reaction layer is at least about 2.0 mass % and not more than about 4.5 mass % while the oxidative weight increase of the reaction layer does not effectively decrease although the quantity of added Mo increases if the quantity of Mo added to the reaction layer is about 7.5 mass % as compared with the case where the quantity of added Mo is at least about 2.0 mass % and not more than about 4.5 mass %. In other words, it is possible to sufficiently and effectively improve oxidation resistance by adding at least about 2.0 mass % and not more than about 4.5 mass % of Mo to the reaction layer.

According to another experiment conducted separately from the aforementioned experiment, it has been proved that the oxidative weight increase can be sufficiently reduced if the quantity of Co added to the reaction layer exceeds about 2.0 mass % as compared with the case of adding no Co to the reaction layer while the efficiency of improvement in oxidation resistance of the reaction layer decreases if the quantity of Co added to the reaction layer exceeds about 10.0 mass %. In other words, it is possible to sufficiently and effectively improve oxidation resistance when adding at least about 2.0 mass % and not more than 10.0 mass % of Co to the reaction layer in the case of adding Co to the reaction layer.

The embodiments and Examples disclosed this time are to be considered as illustrative in all points and not restrictive. The scope of the present invention is shown not by the above description of the embodiments and Examples but by the scope of claim for patent, and all modifications within the meaning and range as the scope of claim for patent are further included.

For example, while the examples of applying the inventive brazed structure to heat exchangers have been described in the aforementioned embodiments, the present invention is not restricted to this but the inventive brazed structure is also applicable to a brazed structure other than the heat exchanger to which high oxidation resistance is required due to flow of high-temperature exhaust gas.

While the example of employing stainless steel as the plates constituting the brazing composite material has been shown in the aforementioned second embodiment, the present invention is not restricted to this but steel including an Ni-based heat-resistant alloy such as Hastelloy (registered trademark) or Inconel (registered trademark) other than stainless steel may be employed as the plates constituting the brazing composite material.

While the examples of employing the Ti layers consisting of only pure Ti as the brazing filler metals have been shown in the aforementioned first and second embodiments, the present invention is not restricted to this but a Ti alloy layer containing pure Ti in the ratio of at least 85% may be employed as the brazing filler metal. As such Ti alloys mainly composed of pure Ti, an α-alloy having an α phase (close-packed hexagonal phase) such as Ti-5Al-2.5Sn and an α+β alloy having an a phase (close-packed hexagonal phase) and a β phase (body-centered cubic phase) such as Ti-6Al-4V can be listed, for example.

Figure 16:
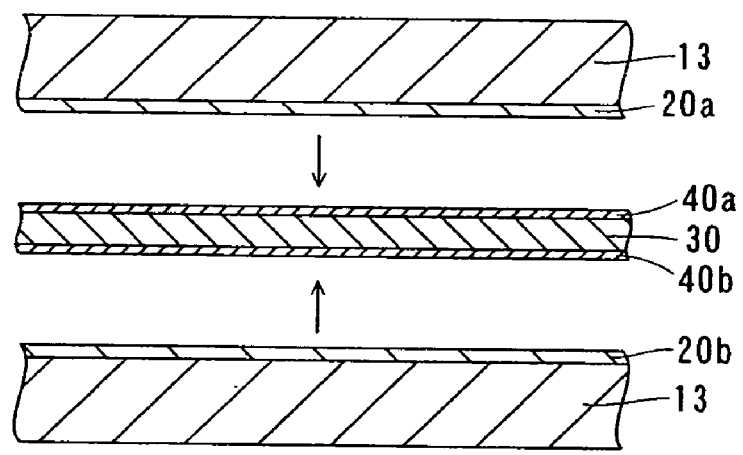
FIG. 16 A sectional view showing the structure of a brazing composite material according to a modification of the present invention.

While the example of performing brazing/bonding with the brazing composite material in which the brazing filler metal 1 having the five-layer structure of such a state that the Ni layers 4a and 4b are rolled/bonded to the surfaces of the Ni—Cr alloy layer 2 while the Ti layers 3a and 3b are rolled/bonded to the Ni layers 4a and 4b respectively has been shown in the aforementioned second embodiment as shown in FIG. 1, the present invention is not restricted but a cladding material formed by rolling/bonding an Ni—Cr alloy layer 20a to a first surface of a plate 13, another cladding material formed by rolling/bonding another Ni—Cr alloy layer 20b to a second surface of another plate 13 and a pair of Ni layers 40a and 40b arranged to hold a Ti layer 30 therebetween may be individually prepared, as shown in FIG. 16. Also in the case of this structure, Ti—Ni—Cr alloy layers can be formed on brazed/bonded portions. In this case, Fe contained in the plates 13 can be inhibited from diffusing into the brazed/bonded portions by increasing the thickness of the Ni—Cr alloy layer 20a.

While the examples of forming the brazing filler metals without adding elements such as Al, V, Si and Zr easily forming oxides to the Ti layers have been described in the aforementioned embodiments, the present invention is not restricted to this but a brazing filler metal prepared by adding the elements such as Al, V, Si and Zr easily forming oxides to Ti layers may be employed. When the elements such as Al, V, Si and Zr easily forming oxides are added to the Ti layers, adhesiveness of oxide layers formed on the surfaces of reaction layers so improve that the oxide layers can be inhibited from separation. Thus, progress of oxidative reaction can be so suppressed that the oxidative weight increases of the reaction layers can be reduced. If the oxide layers separate, exposed portions of the reaction layers are newly oxidized, whereby the oxidative weight increases of the reaction layers increase.

While the examples of constituting the brazing filler metals of Ti layers/Ni layers/Ni—Cr alloy layers/Ni layers/Ti layers have been shown in the aforementioned embodiments, the present invention is not restricted to this but similar effects can be attained also when constituting a brazing filler metal of Ni—Cr alloy layer/Ni layer/Ti layer/Ni layer/Ni—Cr alloy layer.

The invention claimed is:

1. A brazing filler metal consisting of:
an Ni—Cr brazing layer consisting of 20-40 mass % of Cr and the balance Ni;
a Ti brazing layer consisting essentially of Ti; and
an Ni brazing layer consisting essentially of Ni arranged between said Ni—Cr brazing layer and said Ti brazing layer,
wherein the Ti brazing layer is formed so as to be exposed on a surface of the brazing filler metal.

2. The brazing filler metal according to claim 1, wherein the Ni amount in said Ni brazing layer is at least 21.5 mass % and not more than 37.5 mass % where the sum of the Ti amount in said Ti brazing layer and the Ni amount in said Ni brazing layer is 100 mass %.

3. The brazing filler metal according to claim 1, wherein the Ni amount in said Ni brazing layer is around 28.3 mass % where the sum of the Ti amount in said Ti brazing layer and the Ni amount in said Ni brazing layer is 100 mass %.

4. The brazing filler metal according to claim 1, wherein the ratio t2/t1 between thickness t1 of said Ti brazing layer and thickness t2 of said Ni brazing layer is at least ⅛ and not more than ⅔.

5. The brazing filler metal according to claim 4, wherein the ratio t2/t1 between the thickness t1 of said Ti brazing layer and the thickness t2 of said Ni brazing layer is substantially ⅕.

6. The brazing filler metal according to claim 1, wherein said Ti brazing layer includes a first Ti brazing layer consisting of a first Ti layer or a first Ti alloy layer and a second Ti brazing layer consisting of a second Ti layer or a second Ti alloy layer,
said Ni brazing layer includes a first Ni brazing layer consisting of a first Ni layer or a first Ni alloy layer and a second Ni brazing layer consisting of a second Ni layer or a second Ni alloy layer, and
the brazing filler metal consists of such a five-layer structure that said first Ni brazing layer is arranged between said Ni—Cr brazing layer and said first Ti brazing layer while said second Ni brazing layer is arranged between said Ni—Cr brazing layer and said second Ti brazing layer.

7. The brazing filler metal according to claim 1, wherein at least any one of said Ti brazing layer and said Ni brazing layer contains at least either Mo or Co.

8. A brazing filler metal consisting of:
an Ni—Cr brazing layer consisting essentially of 20-40 mass % of Cr and the balance Ni;
a Ti brazing layer consisting essentially of Ti; and
an Ni brazing layer consisting essentially of Ni arranged between said Ni—Cr brazing layer and said Ti brazing layer,
wherein the Ti brazing layer is formed so as to be exposed on a surface of the brazing filler metal,
wherein at least any one of said Ni—Cr brazing layer, said Ti brazing layer and said Ni brazing layer contains at least either Mo or Co, and
wherein the amount of the Mo contained in at least any one of said Ti brazing layer and said Ni brazing layer is at least 2.0 mass % and not more than 4.5 mass % of total mass of said Ni—Cr brazing layer, said Ti brazing layer and said Ni brazing layer.

9. A brazing filler metal consisting of:
an Ni—Cr brazing layer consisting essentially of 20-40 mass % of Cr and the balance Ni;
a Ti brazing layer consisting essentially of Ti; and an Ni brazing layer consisting essentially of Ni arranged between said Ni—Cr brazing layer and said Ti brazing layer, wherein the Ti brazing layer is formed so as to be exposed on a surface of the brazing filler metal, wherein at least any one of said Ni—Cr brazing layer, said Ti brazing layer and said Ni brazing layer contains at least either Mo or Co, and wherein the amount of Co contained in at least any one of said Ti brazing layer and said Ni brazing layer is at least 2.0 mass % and not more than 10.0 mass %.

10. A brazing composite material comprising:
a substrate made of steel; and
a brazing filler metal, rolled/bonded to the surface of said substrate, the brazing filler metal consisting of:
   an Ni—Cr brazing layer consisting essentially of 20-40 mass % of Cr and the balance Ni,
   a Ti brazing layer consisting essentially of Ti, and
   an Ni brazing layer consisting essentially of Ni arranged between said Ni—Cr brazing layer and said Ti brazing layer,
   wherein the Ti brazing layer is formed so as to be exposed on a surface of the brazing filler metal.

11. The brazing composite material according to claim 10, wherein
the Ni amount in said Ni brazing layer is at least 21.5 mass % and not more than 37.5 mass % where the sum of the Ti amount in said Ti brazing layer and the Ni amount in said Ni brazing layer is 100 mass %.

12. The brazing composite material according to claim 11, wherein
the Ni amount in said Ni brazing layer is around 28.3 mass % where the sum of the Ti amount in said Ti brazing layer and the Ni amount in said Ni brazing layer is 100 mass %.

13. The brazing composite material according to claim 10, wherein
the ratio t2/t1 between thickness t1 of said Ti brazing layer and thickness t2 of said Ni brazing layer is at least ⅛ and not more than ⅔.

14. The brazing composite material according to claim 13, wherein
the ratio t2/t1 between the thickness t1 of said Ti brazing layer and the thickness t2 of said Ni brazing layer is substantially ⅕.

15. The brazing composite material according to claim 10, wherein
at least any one of said Ni—Cr brazing layer, said Ti brazing layer and said Ni brazing layer contains at least either Mo or Co.

16. A brazing composite material comprising:
a substrate made of steel; and
a brazing filler metal, rolled/bonded to the surface of said substrate, the brazing filler metal consisting of:
   an Ni—Cr brazing layer consisting essentially of 20-40 mass % of Cr and the balance Ni,
   a Ti brazing layer consisting essentially of Ti, and
   an Ni brazing layer consisting essentially of Ni arranged between said Ni—Cr brazing layer and said Ti brazing layer,
   wherein the Ti brazing layer is formed so as to be exposed on a surface of the brazing filler metal, and
   wherein at least any one of said Ni—Cr brazing layer, said Ti brazing layer and said Ni brazing layer contains at least either Mo or Co, and
   wherein said brazing filler metal contains at least 2.0 mass % and not more than 4.5 mass % of Mo.

17. A brazing composite material comprising:
a substrate made of steel; and
a brazing filler metal, rolled/bonded to the surface of said substrate, the brazing filler metal consisting of:
   an Ni—Cr brazing layer consisting essentially of 20-40 mass % of Cr and the balance Ni,
   a Ti brazing layer consisting essentially of Ti, and
   an Ni brazing layer consisting essentially of Ni arranged between said Ni—Cr brazing layer and said Ti brazing layer,
   wherein the Ti brazing layer is formed so as to be exposed on a surface of the brazing filler metal, and
   wherein at least any one of said Ni—Cr brazing layer, said Ti brazing layer and said Ni brazing layer contains at least either Mo or Co, and
   wherein said brazing filler metal contains at least 2.0 mass % and not more than 10.0 mass % of Co.

* * * * *